US010752238B2

(12) United States Patent
Kiyokawa

(10) Patent No.: US 10,752,238 B2
(45) Date of Patent: Aug. 25, 2020

(54) PARKING ASSISTANCE DEVICE

(71) Applicant: AISIN SEIKI KABUSHIKI KAISHA, Kariya-shi, Aichi-ken (JP)

(72) Inventor: Yusuke Kiyokawa, Toyota (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 611 days.

(21) Appl. No.: 15/223,209

(22) Filed: Jul. 29, 2016

(65) Prior Publication Data

US 2017/0028985 A1    Feb. 2, 2017

(30) Foreign Application Priority Data

Jul. 31, 2015 (JP) .................................. 2015-152790

(51) Int. Cl.
*B60W 30/06* (2006.01)
*G05D 1/00* (2006.01)
(Continued)

(52) U.S. Cl.
CPC ......... *B60W 30/06* (2013.01); *B62D 15/0285* (2013.01); *G01S 15/86* (2020.01); (Continued)

(58) Field of Classification Search
None
See application file for complete search history.

(56) References Cited

U.S. PATENT DOCUMENTS

2009/0085771 A1* 4/2009 Wu ..................... B62D 15/0285
340/932.2
2011/0057813 A1* 3/2011 Toledo ..................... B60T 7/22
340/932.2
(Continued)

FOREIGN PATENT DOCUMENTS

DE    102008050685 A1 *  4/2010  ............. G08G 1/166
DE    102014209907 A1    11/2015
(Continued)

OTHER PUBLICATIONS

Gotzig, DE-102008050685-A1, EPO machine translation (Mar. 14, 2020). (Year: 2020).*

(Continued)

*Primary Examiner* — Kevin P Mahne
(74) *Attorney, Agent, or Firm* — Sughrue Mion, PLLC

(57) ABSTRACT

A parking assistance device includes: an obstacle detection unit that detects an obstacle; a separated distance determination unit that determines a separated distance between the obstacles when a plurality of the obstacles are detected; a target position determination unit that determines a target position in a guidance route; a route calculation unit that calculates the guidance route; and a control unit that guides a vehicle in accordance with the guidance route, wherein, when a second obstacle is detected in a second direction orthogonal to a first direction in which one or plurality of first obstacles extends or are lined up while being separated from each other and at a position separated from the first direction, the separated distance determination unit determines the separated distance between the first and second obstacles.

7 Claims, 14 Drawing Sheets

(51) Int. Cl.
  *G01S 15/87* (2006.01)
  *B62D 15/02* (2006.01)
  *G01S 15/931* (2020.01)
  *G01S 15/86* (2020.01)

(52) U.S. Cl.
  CPC .......... *G01S 15/876* (2013.01); *G01S 15/931* (2013.01); *G05D 1/0088* (2013.01); *B60W 2554/00* (2020.02); *B60W 2900/00* (2013.01); *G01S 2015/934* (2013.01); *G01S 2015/935* (2013.01); *G01S 2015/938* (2013.01)

(56) References Cited

U.S. PATENT DOCUMENTS

| | | | | |
|---|---|---|---|---|
| 2011/0074604 A1* | 3/2011 | Hsu | ................... | B62D 15/0285 340/932.2 |
| 2011/0148663 A1* | 6/2011 | Barth | ................... | B62D 15/027 340/932.2 |
| 2012/0173080 A1* | 7/2012 | Cluff | ................... | B62D 15/028 701/42 |
| 2013/0096816 A1* | 4/2013 | Takano | ............... | B62D 15/0265 701/400 |
| 2014/0032031 A1* | 1/2014 | Okamura | ........... | B62D 15/0285 701/23 |
| 2015/0179075 A1* | 6/2015 | Lee | ........................ | G08G 1/165 340/932.2 |
| 2016/0236680 A1* | 8/2016 | Lavoie | .................. | B60W 30/06 |
| 2016/0280263 A1* | 9/2016 | Mori | .................... | B62D 15/027 |
| 2017/0242122 A1* | 8/2017 | Suzuki | .................. | G01S 15/931 |

FOREIGN PATENT DOCUMENTS

EP   2881754 A1 * 12/2013 ............. G01S 13/93
JP   2014-101101 A   6/2014

OTHER PUBLICATIONS

Communication dated Dec. 12, 2016, from the European Patent Office in application No. 16181841.4.

* cited by examiner

US 10,752,238 B2

PARKING ASSISTANCE DEVICE

CROSS REFERENCE TO RELATED APPLICATIONS

This application is based on and claims priority under 35 U.S.C. § 119 to Japanese Patent Application 2015-152790, filed on Jul. 31, 2015, the entire contents of which are incorporated herein by reference.

TECHNICAL FIELD

An embodiment of this disclosure relates to a parking assistance device.

BACKGROUND DISCUSSION

In the related art, a parking assistance device that performs guidance for parking a vehicle (a host vehicle) in an area where parking is allowed has been proposed. In this type of technology, a target position or a guidance route for parking the vehicle is set by detecting surrounding obstacles (for example, another car, walls, curbs, trees, and posts) using a detection unit mounted on the vehicle (for example, an ultrasonic sonar), in such a manner that the obstacles and the vehicle do not interfere (come in contact) with each other.

JP 2014-101101A is an example of the related art.

However, in a case of using an ultrasonic sonar, it is known that there is a characteristic that, since presence of an obstacle (an object) or a distance to the obstacle is detected by performing a detection of a reflected wave, the height of the obstacle cannot be accurately detected. For example, consider a case of parallel parking a vehicle on a road side. In this case, if the obstacle present at a depth side of a parking space is a curb having a short stature, the vehicle can be parked close to the obstacle. On the other hand, if the obstacle present at a depth side is an obstacle having a tall stature such as a wall, a possibility of contact is high. Therefore, it is necessary to park the vehicle by keeping the vehicle away from the obstacle by a certain distance. However, in a case of the parking assistance using the ultrasonic sonar, in performing the detection using the ultrasonic sonar, it is not possible to accurately detect whether the obstacle is an object having a short stature or an object having a tall stature. Therefore, in a case of performing the parking assistance, the vehicle has been guided such that a constant distance is always ensured under the assumption that the obstacle is an object having a tall stature. Therefore, even in a case where the obstacle is a curb and the vehicle can be parked close to the obstacle, the vehicle is guided to a position spaced apart by a certain distance. That is, there has been a case where the vehicle cannot be guided to an appropriate parking position. It is conceivable to separately provide a sensor that can detect the height of an obstacle, but it is not preferable due to a cost increase.

SUMMARY

Thus, a need exists for a parking assistance device which is not suspectable to the drawback mentioned above.

A parking assistance device according to an embodiment includes: for example, an obstacle detection unit that detects an obstacle; a separated distance determination unit that determines a separated distance between the obstacles in a case where a plurality of the obstacles are detected; a target position determination unit that determines a target position in a guidance route; a route calculation unit that calculates the guidance route; and a control unit that guides a vehicle in accordance with the guidance route. In a case where a second obstacle is detected in a second direction which is orthogonal to a first direction in which a first obstacle extends or a plurality of first obstacles are lined up while being separated from each other and the second obstacle is detected at a position separated from the first direction, the separated distance determination unit determines the separated distance between the first obstacle and the second obstacle. The target position determination unit determines a target position which is lined up with the first obstacle in the first direction and the target position which overlaps the second obstacle or is adjacent to the second obstacle, determines the target position such that the first obstacle and a side-end portion of the vehicle in a vehicle width direction which does not face the second obstacle are lined up in the first direction, in a case where the separated distance between the first obstacle and the second obstacle is shorter than a first distance, and determines the target position such that the vehicle is separated by equal to or longer than a predetermined distance from the second obstacle, in a case where the separated distance between the first obstacle and the second obstacle is equal to or longer than the first distance. According to this configuration, for example, in a case where the detected separated distance between the first obstacle and the second obstacle is shorter than the first distance, it means that the first obstacle is close to the second obstacle. Conversely, in a case where the separated distance between the first obstacle and the second obstacle is equal to or longer than the first distance, it means that the first obstacle is away from the second obstacle. Therefore, by determining the target position for guiding the vehicle using positional relationships between the first obstacle and the second obstacle, it is possible to guide and park the vehicle (the host vehicle) in order to park at an appropriate position with respect to the second obstacle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed herein. Configurations in the embodiment described hereinafter and actions, results and effects brought by the configuration are merely examples. This disclosure can also be realized by a configuration other than that disclosed in the embodiment described hereinafter, and at least one of various effects and derivative effects based on the basic configuration can be obtained.

In the present embodiment, a vehicle 1 with a parking assistance device mounted thereon may be, for example, an automobile of which a drive source is an internal combustion engine (not illustrated), that is, an internal combustion engine vehicle, may be an automobile of which a drive source is an electric motor (not illustrated), that is, an electric vehicle, a fuel-cell vehicle or the like, may be a hybrid vehicle of which the drive source is both the internal combustion engine and the electric motor, or may be a vehicle having another drive source. In addition, the vehicle 1 can mount various transmissions, or can mount various devices such as a system or components necessary for driving the internal combustion engine and the electric motor. In addition, a device, a method, the number, a layout relating to driving of vehicle wheels 3 of the vehicle 1 can be variously set.

Figure 1:
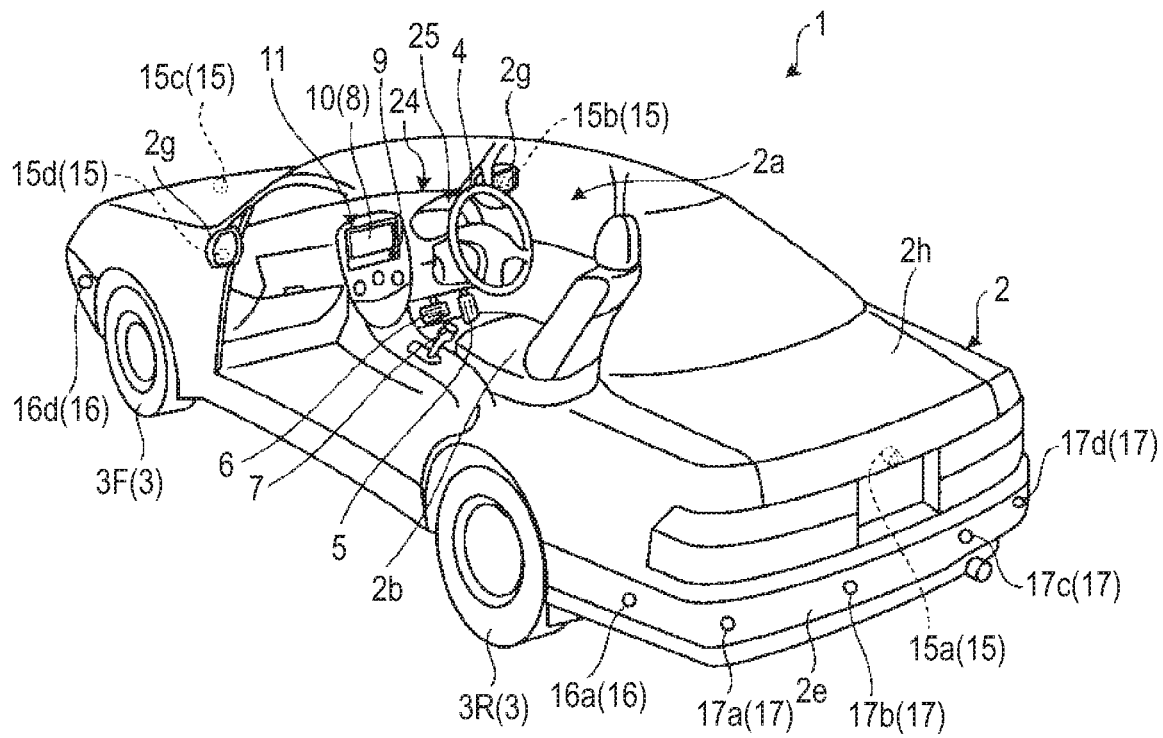
FIG. 1 is an exemplary perspective view illustrating a state in which a part of a passenger compartment of a vehicle in an embodiment is seen.

As illustrated in FIG. 1, a vehicle body 2 configures a passenger compartment 2a in which occupants (not illustrated) are seated. In the passenger compartment 2a, a steering section 4, an acceleration operation section 5, a brake operation section 6, and a shift operation section 7 are provided in a state of facing a seat 2b of a driver as the occupant. The steering section 4 is, for example, a steering wheel protruded from a dashboard 24, the acceleration operation section 5 is, for example, an accelerator pedal positioned under a foot of the driver, the brake operation section 6 is, for example, a brake pedal positioned under the foot of the driver, and the shift operation section 7 is, for example, a shift lever protruding from a center console. The steering section 4, the acceleration operation section 5, the brake operation section 6, and the shift operation section 7 are not limited to those described above.

In addition, a display device 8 as a display output unit and a voice output device 9 as a voice output unit are provided in the passenger compartment 2a. The display device 8 is, for example, a liquid crystal display (LCD), an organic electro luminescent display (OELD), or the like. The voice output device 9 is, for example, a speaker. In addition, the display device 8 is covered by a transparent operation input unit 10 such as a touch panel. The occupants can visually recognize an image displayed on a display screen of the display device 8 via the operation input unit 10. In addition, the occupants can execute an operation input by operations such as touching, pressing or moving the operation input unit 10 by a finger on a position corresponding to the image displayed on the display screen of the display device 8. The display device 8, the voice output device 9, and the operation input unit 10 are provided on a monitor device 11 positioned on the dashboard 24 at a center portion in a vehicle width direction, that is, a horizontal direction. The monitor device 11 can include an operation input unit (not illustrated) such as a switch, a dial, a joystick, a press button, or the like. In addition, a voice output device (not illustrated) can be provided at another position in the passenger compartment 2a that is different from the position of the monitor device 11, or the voice can be output from another voice output device that is different from the voice output device 9 of the monitor device 11. The monitor device 11 is also used as, for example, a navigation system or an audio system.

Figure 3:
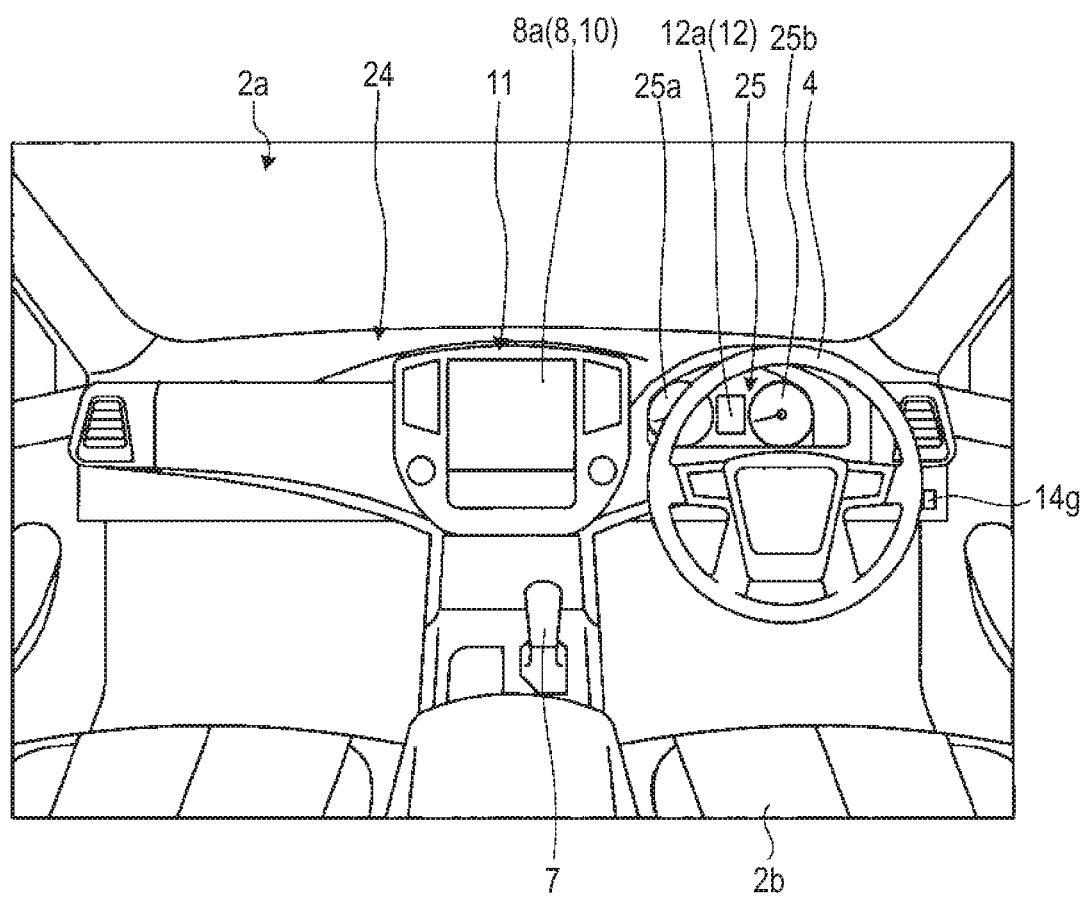
FIG. 3 is a diagram illustrating an example of a dashboard of the vehicle in the embodiment seen from a rear side of the vehicle.

In addition, a display device 12 which is different from the display device 8 is provided in the passenger compartment 2a. As illustrated in FIG. 3, the display device 12 is provided, for example, on an instrument panel section 25 of the dashboard 24, and is positioned between a speed display section 25a and a rotational speed display section 25b at substantially the center of the instrument panel section 25. A size of a screen 12a of the display device 12 is smaller than a size of a screen 8a (FIG. 3) of the display device 8. An image indicating information relating to the parking assistance of the vehicle 1 is mainly displayed on this display device 12. An amount of information displayed on the display device 12 may be smaller than an amount of information displayed on the display device 8. The display device 12 is, for example, an LCD or an OELD. The information displayed on the display device 12 may be displayed on the display device 8.

Figure 2:
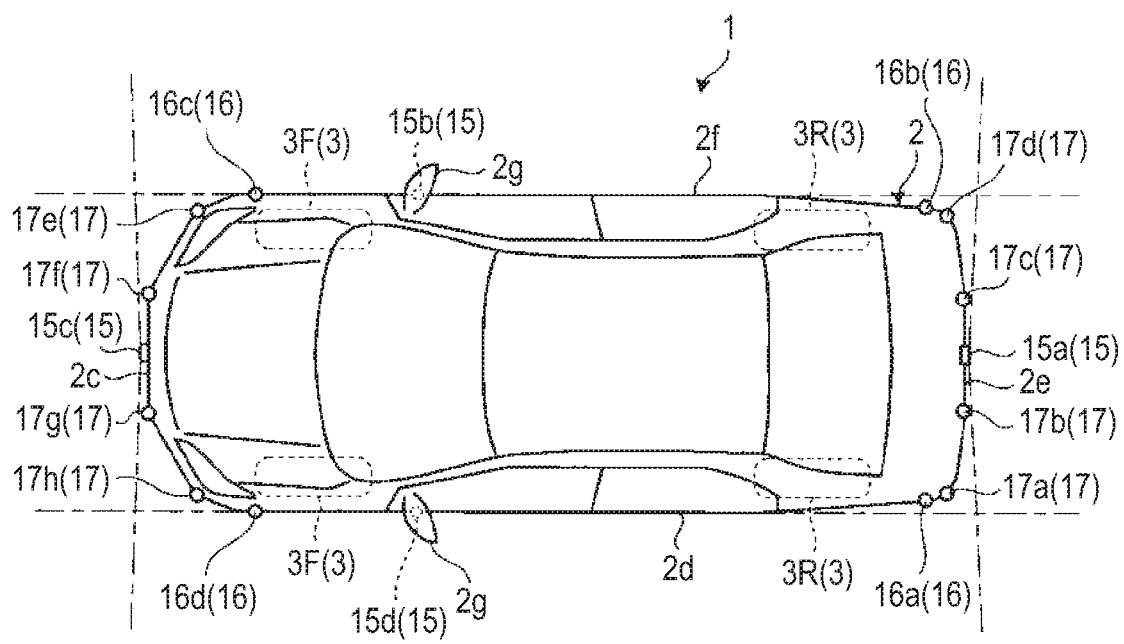
FIG. 2 is an exemplary plan view illustrating the vehicle in the embodiment.
Figure 4:
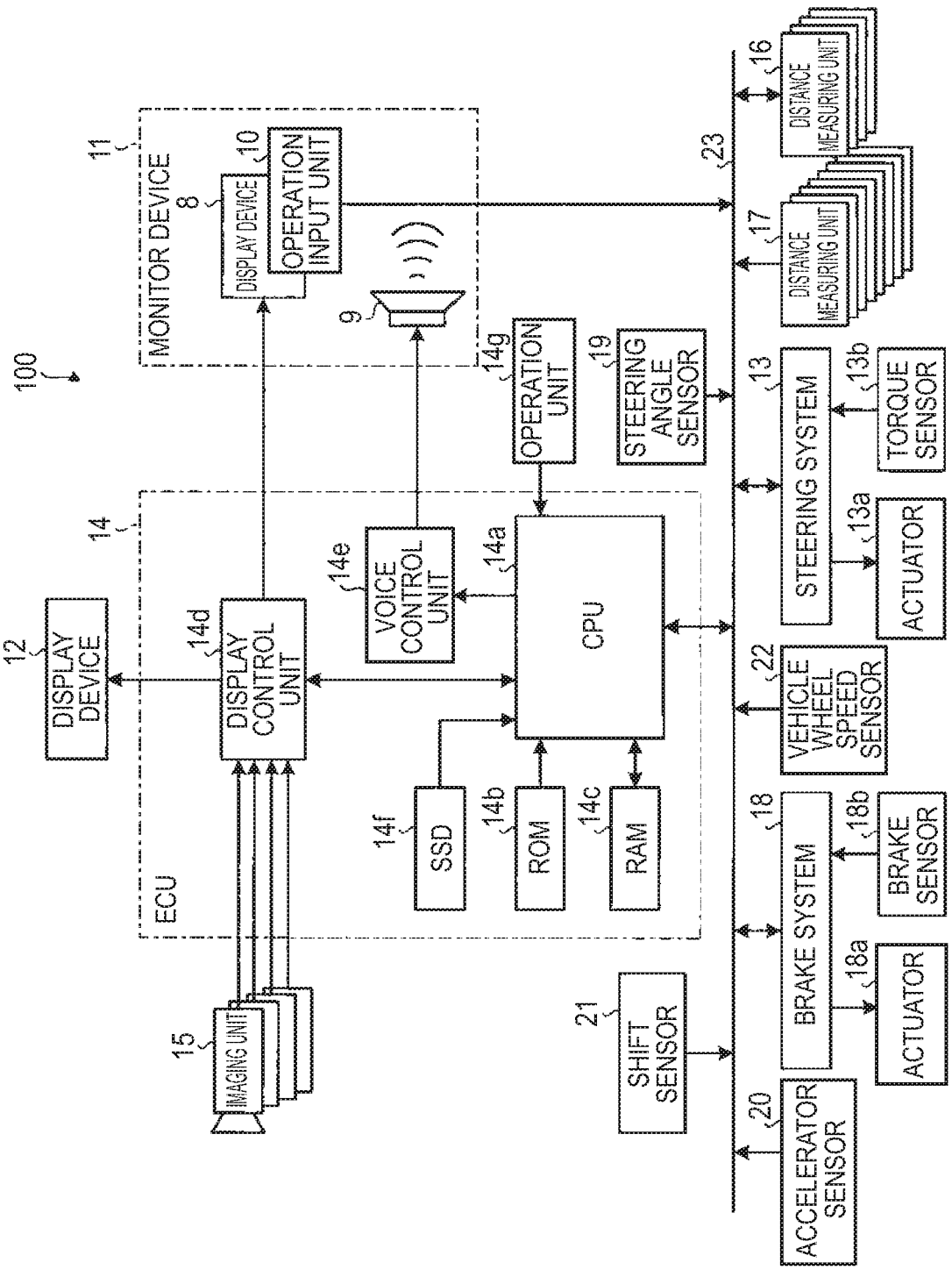
FIG. 4 is an exemplary block diagram illustrating a configuration of a parking assistance system in the embodiment.

In addition, as illustrated in FIG. 1 and FIG. 2, the vehicle 1 is a four wheel vehicle, and includes right and left front wheels 3F and right and left rear wheels 3R. Any of these four vehicle wheels 3 are configured so as to be steered. As illustrated in FIG. 4, the vehicle 1 includes a steering system 13 that steers at least two vehicle wheels 3. The steering system 13 includes an actuator 13a and a torque sensor 13b. The steering system 13 is electrically controlled by an electronic control unit (ECU) 14 or the like, and operates the actuator 13a. The steering system 13 is, for example, an electric power steering system, a steer by wire (SBW) system, or the like. The steering system 13 supplements a steering force by adding torque, that is, assisted torque to the steering section 4 using the actuator 13a or steers the vehicle wheels 3 using the actuator 13a. In this case, the actuator 13a may steer one vehicle wheel 3 or may steer a plurality of vehicle wheels 3. In addition, the torque sensor 13b detects, for example, a torque applied to the steering section 4 from the driver.

In addition, as illustrated in FIG. 2, for example, four imaging units 15a to 15d are provided on the vehicle body 2 as a plurality of imaging units 15. The imaging unit 15 is a digital camera in which an imaging element such as a charge coupled device (CCD) or a CMOS image sensor (CIS) is incorporated. The imaging unit 15 can output moving picture data in a predetermined frame rate. The imaging unit 15 respectively includes a wide-angle lens and a fish-eye lens and can image a range of, for example, 140° to 190° in the horizontal direction. In addition, an optical axis of the imaging unit 15 is set obliquely downward. Accordingly, the imaging unit 15 sequentially images an external environment around the vehicle body 2 including a road surface where the vehicle 1 can move or an area where the vehicle 1 can park, and outputs the image as imaged image data.

The imaging unit 15a is positioned, for example, at an end portion 2e on the rear side of the vehicle body 2 and is provided on a wall portion at a lower side of a door 2h of a rear trunk. The imaging unit 15b is positioned, for example, at an end portion 2f on the right side of the vehicle body 2 and is provided on a right side rear view mirror 2g. The imaging unit 15c is positioned, for example, at an end portion 2c on the front side, that is, the front side in the longitudinal direction of the vehicle body 2 and is provided on a front bumper or the like. The imaging unit 15d is positioned, for example, at an end portion 2d on the left side, that is, the left side in the vehicle width direction of the vehicle body 2 and is provided on a rear view mirror 2g as a left side protrusion portion. The ECU 14 executes calculation processing and image processing based on the image data obtained from the plurality of imaging units 15, and then, can generate an image of a wide viewing angle or generate a virtual bird's-eye view image viewed from above the vehicle 1. The bird's-eye view image is referred to as a plane image.

In addition, the ECU 14 identifies partition lines or the like indicated on the road surface around the vehicle 1 from the image imaged by the imaging unit 15, and detects (extracts) a parking section indicated by the partition lines.

In addition, as illustrated in FIG. 1 and FIG. 2, for example, four distance measuring units 16a to 16d and eight distance measuring units 17a to 17h are provided on the vehicle body 2 as a plurality of distance measuring units 16 and 17. The distance measuring units 16 and 17 are, for example, sonar items that emit ultrasonic waves and catch reflected waves. The sonar is also referred to as a sonar sensor, an ultrasonic detector, or an ultrasonic sonar. In the present embodiment, when the vehicle 1 is parallel parked, the distance measuring unit 16 can detect a first obstacle (an adjacent vehicle) lined up with the vehicle 1 or a second obstacle (for example, a curb, a step, a wall, or a fence) being present at the depth side of a space for the parallel parking, and then, can measure distances to those obstacles. In addition, in a case where an obstacle (an object) approaches the vehicle 1 closer than a predetermined distance, the distance measuring unit 17 can detect the approaching obstacle (the object), and then, can measure a distance to the obstacle. Particularly, the distance measuring units 17a and 17d arranged at both of the rear sides of the vehicle 1 function as a sensor (clearance sonar) that measures the distance between a rear corner portion of the vehicle 1 and the first obstacle (adjacent vehicle) in a case where the vehicle 1 enters the parallel parking space while backward driving, or measures the distance between the rear corner portion and the second obstacle (the wall or the like) after entering the parking space. The ECU 14 can identify the presence of the object or the like positioned around the vehicle 1 and can measure the distance to the object according to the result of detection by the distance measuring units 16 and 17. That is, the distance measuring units 16 and 17 are an example of the detection unit that detects the object. The distance measuring unit 17 is used for detecting, for example, an object of relatively short distance, and the distance measuring unit 16 is used for detecting, for example, an object of relatively longer distance than the distance measuring unit 17. In addition, the distance measuring unit 17 is used for detecting an object at the front and rear of the vehicle 1, and the distance measuring unit 16 is used for detecting an object at the sides of the vehicle 1. The distance measuring unit 17 functions as a proximity sensor that detects the object (obstacle) close to a predetermined distance.

In addition, as illustrated in FIG. 4, in a parking assistance system 100 (a parking assistance device), a brake system 18, a steering angle sensor 19, an accelerator sensor 20, a shift sensor 21, and a vehicle wheel speed sensor 22 are electrically connected to each other via an in-vehicle network 23 as a telecommunication line in addition to the ECU 14, the monitor device 11, the steering system 13, and the distance measuring units 16 and 17. The in-vehicle network 23 is configured, for example, as a controller area network (CAN). The ECU 14 can control the steering system 13, the brake system 18, or the like by sending a control signal via the in-vehicle network 23. In addition, the ECU 14 can receive the result of detection by the torque sensor 13b, the brake sensor 18b, the steering angle sensor 19, the distance measuring unit 16, the distance measuring unit 17, the accelerator sensor 20, the shift sensor 21, the vehicle wheel speed sensor 22, and the like, or an operation signal of the operation input unit 10 via the in-vehicle network 23.

The ECU 14 includes, for example, a central processing unit (CPU) 14a, a read only memory (ROM) 14b, a random access memory (RAM) 14c, a display control unit 14d, a voice control unit 14e, a solid state drive (SSD) 14f (flash memory), or the like. The CPU 14a can execute various calculation processing and controls such as image processing relating to the image displayed on the display devices 8 and 12, determination of a moving target position (parking target position, target position) of the vehicle 1, calculation of the guidance route (guidance route, parking route, parking guidance route) of the vehicle 1, determination of a presence or absence of the interference with the object, an automatic control of the vehicle 1, release of the automatic control, and the like. The CPU 14a can read out a program installed and stored in a non-volatile storage device such as the ROM 14b, and can execute the calculation processing according to the program. The RAM 14c temporarily stores various data used for the calculation by the CPU 14a. In addition, the display control unit 14d mainly executes the image processing using the image data obtained by the imaging unit 15 and the composition of the image data to be displayed on the display device 8 among the calculation processing items in the ECU 14. In addition, the voice control unit 14e mainly executes processing of the voice data output from the voice output device 9 among the calculation processing items in the ECU 14. In addition, the SSD 14f is a rewritable non-volatile storage unit, and can store data even in a case where the power of the ECU 14 is turned off. The CPU 14a, ROM 14b, RAM 14c, and the like are integrated in one package. In addition, the ECU 14 may be configured to use another logical operation processor or a logic circuit such as a digital signal processor (DSP) or the like instead of the CPU 14a. In addition, a hard disk drive (HDD) may be provided instead of the SSD 14f, and the SSD14f and the HDD may be provided separate from the ECU 14.

The brake system 18 is, for example, an anti-lock brake system (ABS) that suppresses locking of the brake, an electronic stability control (ESC) that suppresses skidding of the vehicle 1 at the time of cornering, an electric brake system that enhances the braking force (executes a braking assist), a brake by wire (BBW), and the like. The brake system 18 gives a braking force to the vehicle wheels 3, and eventually to the vehicle 1 via the actuator 18a. In addition, the brake system 18 can detect locking of the brake, idling of the vehicle wheels 3, or signs of skidding from the rotation difference between the right and left vehicle wheels 3, and can execute various controls. A brake sensor 18b is, for example, a sensor that detects a position of a movable portion of the brake operation section 6. The brake sensor 18b can detect the position of the brake pedal as the movable portion. The brake sensor 18b includes a displacement sensor.

The steering angle sensor 19 is a sensor that detects an amount of steering of the steering section 4 such as the steering wheel. The steering angle sensor 19 is configured using, for example, a hall element or the like. The ECU 14 acquires the amount of steering of the steering section 4 by the driver or an amount of steering of each vehicle wheel 3 in a case of automatic steering from the steering angle sensor 19, and executes various controls. The steering angle sensor 19 detects a rotation angle of a rotating part included in the steering section 4. The steering angle sensor 19 is an example of an angle sensor.

The accelerator sensor 20 is, for example, a sensor that detects a position of a movable portion of the acceleration operation section 5. The accelerator sensor 20 can detect the position of the accelerator pedal as the movable portion. The accelerator sensor 20 includes a displacement sensor.

The shift sensor 21 is, for example, a sensor that detects a position of a movable portion of the shift operation section 7. The shift sensor 21 can detect a position of a lever, an arm, a button, or the like as the movable portion. The shift sensor 21 may include a displacement sensor or may be configured as a switch.

The vehicle wheel speed sensor 22 is a sensor that detects an amount of rotation or the number of rotations of the vehicle wheels 3 per unit time. The vehicle wheel speed sensor 22 outputs the number of the vehicle wheel speed pulses indicating the detected number of rotations as a sensor value. The vehicle wheel speed sensor 22 is configured using, for example, the hall element or the like. The ECU 14 calculates an amount of movement of the vehicle 1 based on the sensor value acquired from the vehicle wheel speed sensor 22, and executes various controls. In some cases, the vehicle wheel speed sensor 22 is provided on the brake system 18. In this case, the ECU 14 acquires the result of detection by the vehicle wheel speed sensor 22 via the brake system 18.

The configuration, the arrangement, the electrical connection form of various sensors and the actuator described above are just examples, and can be variously set (changed).

Figure 5:
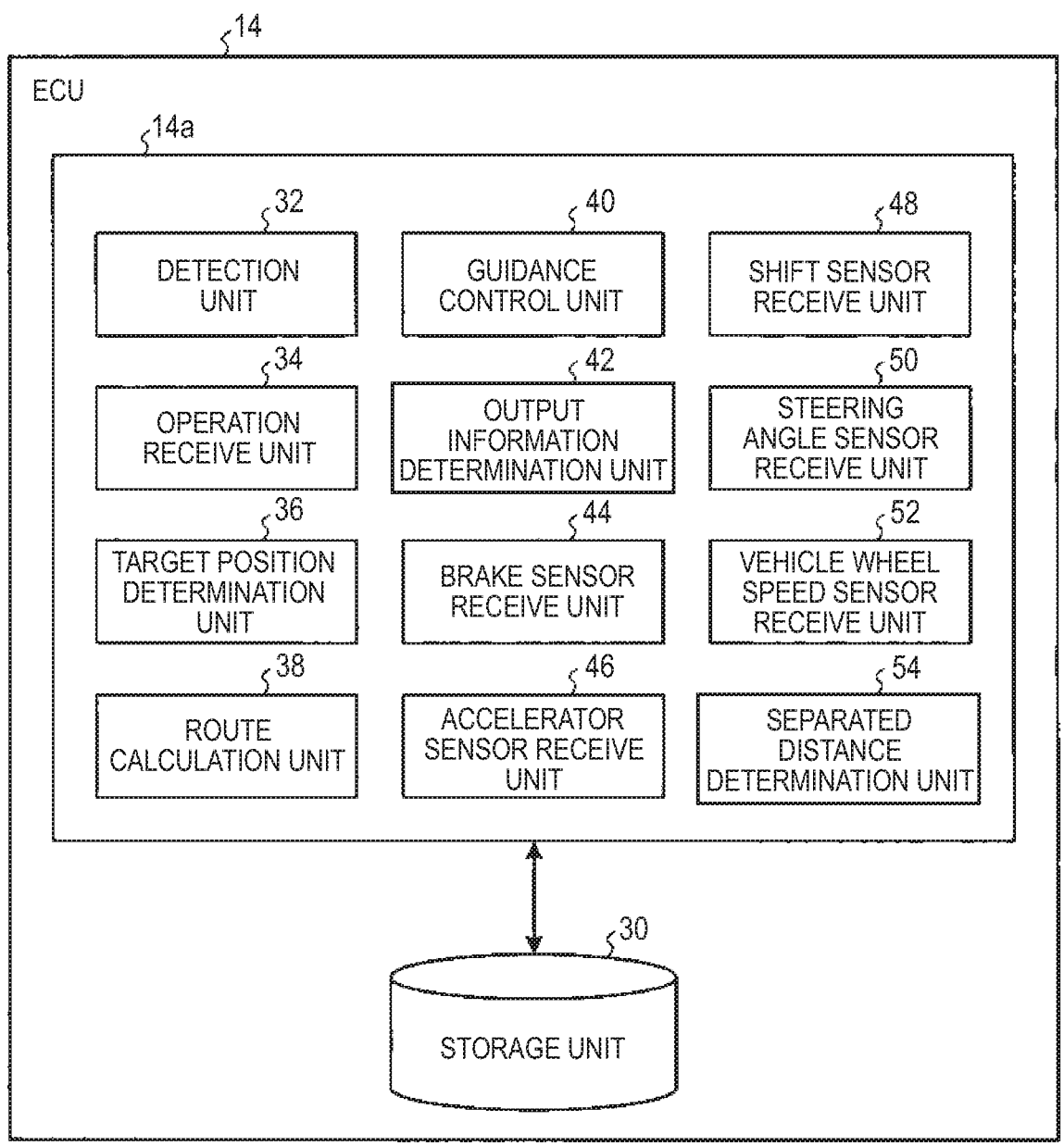
FIG. 5 is an exemplary block diagram illustrating a configuration of an ECU of the parking assistance system in the embodiment.

In addition, as illustrated in FIG. 5, the ECU 14 includes a CPU 14a and a storage unit 30 that stores data used for the calculation in the CPU 14a or calculation resulting data calculated in the CPU 14a. In addition, the CPU 14a includes various modules that are realized by reading a program installed and stored in a storage device such as a ROM 14b and executing the program. For example, the CPU 14a includes a detection unit 32, an operation receive unit 34, a target position determination unit 36, a route calculation unit 38, a guidance control unit 40 (control unit), an output information determination unit 42, a brake sensor receive unit 44, an accelerator sensor receive unit 46, a shift sensor receive unit 48, a steering angle sensor receive unit 50, a vehicle wheel speed sensor receive unit 52, and a separated distance determination unit 54.

The detection unit 32 detects an obstacle, border lines and partition lines on the road surface around the vehicle 1 based on information provided from the imaging unit 15 and the distance measuring units 16 and 17. In addition, the detection unit 32 can also function as a detection unit that detects a parking available area at the area around the vehicle 1 based on the detected obstacle, border lines, and partition lines. In addition, the detection unit 32 can also function as an obstacle detection unit that detects a parked vehicle which has been parked already when detecting the parallel parking available area as a first obstacle, or detects a curbstone or a wall which is present at the depth side (road shoulder side) of the first obstacle as a second obstacle. In addition, the detection unit 32 can also function as a proximity detection unit that detects that the first obstacle or the second obstacle approaches the vehicle 1 within a predetermined distance based on information provided from the distance measuring unit 17.

The operation receive unit 34 acquires a signal by an operation input of an operation unit 14g. The operation unit 14g is, for example, a press button, a switch or the like, and can perform a request or cancellation of the parking assistance. The target position determination unit 36 determines a moving target position (a target position), in other words, a parking target position of the vehicle 1. The route calculation unit 38 calculates a guidance route or a parking guidance route for guiding the vehicle 1 from the current position to a target position for parking included in the parking available area of the vehicle 1. The guidance control unit 40 (the control unit) controls each unit of the vehicle 1 such that the vehicle 1 moves to the target position for moving or the target position for parking along the guidance route or the parking guidance route. The output information determination unit 42 determines information output from the display devices 8 or 12 or the voice output device 9, and the output forms of the information. For example, the guidance control unit 40 may guide the vehicle 1 so as to move, by providing a voice or a video such that the driver can perform the driving operation along the guidance route or the parking guidance route. In addition, the guidance control unit 40 may send the control signal to the steering system 13, the brake system 18, an engine control device or the like such that the vehicle 1 automatically moves along the guidance route or the parking guidance route. The guidance control unit 40 may execute all the operations for the movement of the vehicle 1 or may execute a part of the operations, and may cause the driver to execute the remaining operations. In a case where there is a driver's operational intervention when the guidance control unit 40 executes the (automatic) operation of the vehicle 1, the guidance control unit 40 may give priority to the driver's operation.

The brake sensor receive unit 44 acquires a signal output from a brake sensor 18b, that is, a signal based on the operation input of the brake operation section 6 which is, for example, the brake pedal. The brake sensor receive unit 44 functions as an intention confirmation unit that acquires an intention confirmation signal such as a driver's (user's) intention for the deceleration and parking or stopping. The brake sensor receive unit 44 may acquire an operation input for a parking brake (not illustrated) or may function so as to acquire the intention confirmation signal of the driver's (user's) intention for the parking or stopping based on the operation input. The accelerator sensor receive unit 46 acquires a signal output from the accelerator sensor 20, that is, a signal based on the operation input of the acceleration operation section 5 which is, for example, the accelerator pedal. The accelerator sensor receive unit 46 functions as an intention confirmation unit that acquires an intention confirmation signal such as a driver's intention for driving and acceleration. The shift sensor receive unit 48 acquires a signal output from a shift sensor 21, that is, a signal based on the operation input of the shift operation section 7 which is, for example, a shift lever. The shift sensor receive unit 48 functions as the intention confirmation unit that acquires an intention confirmation signal of the driver's intention for forward driving by receiving a signal indicating "D position" and acquires an intention confirmation signal of the driver's intention for backward driving by receiving a signal indicating "R position". Similarly, the shift sensor receive unit 48 functions as the intention confirmation unit that acquires an intention confirmation signal of the driver's intention for parking and stopping by receiving a signal indicating "P position". The steering angle sensor receive unit 50 acquires a signal output from the steering angle sensor 19, that is, a signal based on the operation input of the steering section 4 which is, for example, the steering wheel. The steering angle sensor receive unit 50 functions as an intention confirmation unit that acquires a steering state of the vehicle 1 and the intention confirmation signal indicating the driver's intention for steering. The vehicle wheel speed sensor receive unit 52 acquires a signal output from the vehicle wheel speed sensor 22, and functions as an acquisition unit that acquires information for determining a driving state or a stopping state of the vehicle 1 based on the vehicle speed and acquires information for determining the quality of a guidance state in a case of automatic guidance for the parking. The modules described above are described as examples of configurations separately configured in function wise. However, two functions or two or more functions may be integrated in the configuration. For example, the brake sensor receive unit 44, the accelerator sensor receive unit 46, the shift sensor receive unit 48, the steering angle sensor receive unit 50, and the vehicle wheel speed sensor receive unit 52 may be integrated as a sensor receive unit.

The separated distance determination unit 54 determines a separated distance between a plurality of obstacles in a case where the detection unit 32 detects a plurality of obstacles. For example, in a case where a second obstacle is detected at the position separated from a first direction that is a direction in which one first obstacle extends or a direction in which a plurality of first obstacles are lined up while being separated from each other, to a second direction that is orthogonal to the first direction, the separated distance determination unit 54 determines a separated distance between the first obstacle and the second obstacle. Details of the determination of the separated distance will be described below.

Figure 6:
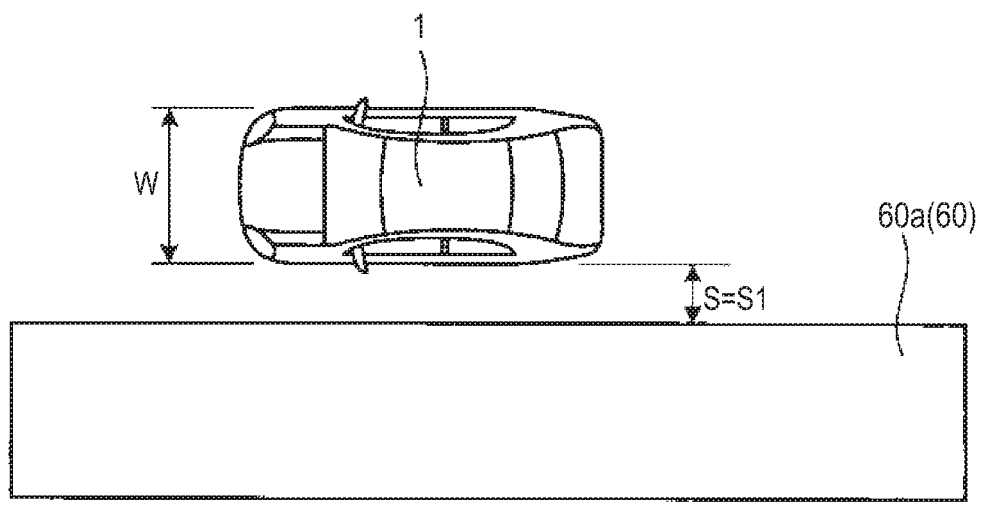
FIG. 6 is a diagram illustrating a positional relationship between a first obstacle and a second obstacle in the parking assistance system in the embodiment, and illustrating a state in which the first obstacle is parked at a distance separated from the second obstacle.

Incidentally, in a case of parking the vehicle 1 in parallel, the vehicle 1 stops in a state of approaching the depth-side obstacle which is an obstacle being present, for example, at the left side of the forward direction of the vehicle 1 in a case of left-hand traffic. In some of these cases, it is preferable to make an approaching degree of the vehicle 1 to the depth-side obstacle be different depending on the height of the stature of the depth-side obstacle. For example, in a case where the depth-side obstacle is a wall (substantially, a structure which looks like a wall) having a long stature, when the vehicle 1 approaches too close to the depth-side obstacle, there is a case where the possibility of contact becomes high at the time of guidance of the vehicle 1 or coming out of the vehicle 1, or there is a case where it becomes difficult to open or close the door of the obstacle side. Therefore, as illustrated in FIG. 6, in a case where a depth-side obstacle 60 is an obstacle having a long stature such as a wall 60a, it is desired that the vehicle 1 is parked in a state of securing a large space S. By securing a large space S as described above, it is possible to reduce or eliminate the possibility of contact to the wall 60a at the time of moving for the parallel parking, and it is possible to make the driving operation easy at the time of coming out from the state of the parallel parking.

Figure 7:
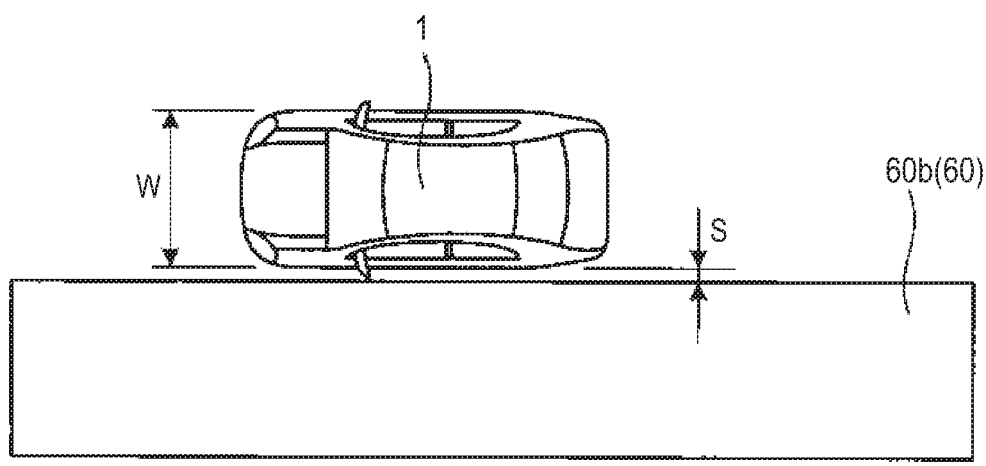
FIG. 7 is a diagram illustrating a positional relationship between a first obstacle and a second obstacle in the parking assistance system in the embodiment, and illustrating a state in which the first obstacle is parked close to the second obstacle.

On the other hand, in a case where the depth-side obstacle 60 has a short stature, even when the vehicle 1 approaches the depth-side obstacle 60, the possibility of contact between a side surface (left side surface or the left side door) of the vehicle 1 and the depth-side obstacle 60 is low. In addition, the possibility that opening and closing the obstacle side door is intervened by the obstacle is low. Therefore, as illustrated in FIG. 7, in a case where the depth-side obstacle 60 is an obstacle having a short stature such as a curbstone 60b (otherwise, a level difference or a protrusion), the vehicle 1 can be parked in a state of almost without securing the space S. As described above, by reducing the space S, an amount of protrusion of the vehicle 1 to the travelling area side can be reduced in a case of parallel parking, and thus, it is possible to reduce the possibility of interfering with traffic in the travelling area.

That is, in a case of an intention to park the vehicle 1 (host vehicle) in parallel along the depth-side obstacle 60, even in a case where the height of the depth-side obstacle 60 cannot be directly detected by the distance measuring unit 16 as described above, it is possible to determine how to park the vehicle 1 (the host vehicle) based on the parking position of another vehicle parked in parallel along the depth-side obstacle 60 with respect to the depth-side obstacle 60.

Figure 8:
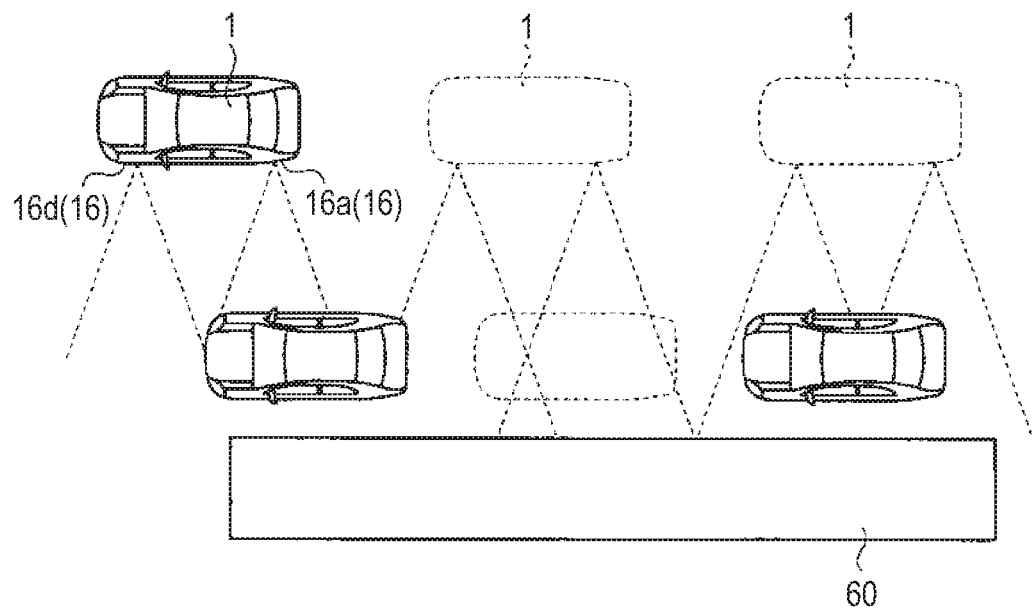
FIG. 8 is a diagram illustrating a state in which the vehicle (the host vehicle) detects the first obstacle and the second obstacle using an ultrasonic sonar in order to search for a parking space in the parking assistance system in the embodiment.

FIG. 8 is a diagram illustrating a state in which the distance measuring unit 16 detects an obstacle being present at the side of the vehicle 1 during the travelling or stop of the vehicle 1. The distance measuring unit 16 may always be activated when the power switch of the vehicle 1 is in an ON state or may be activated only when a detection start operation is performed using the operation unit 14g or the like. In addition, for example, by providing an ordinary travelling mode and a parking assistance mode, a detection period, a detection area, and detection accuracy may be switched. In a case of the parking assistance system 100 in the present embodiment, as illustrated in FIG. 8, the detection of the obstacle is performed using the distance measuring unit 16 (16a and 16d) while the vehicle 1 moves. As described above, since the distance measuring unit 16 is configured with an ultrasonic sonar, the detection unit 32 can detect the presence of the obstacle at the side of the vehicle 1 (the host vehicle) and the distance to the obstacle.

The CPU 14a performs the construction of information for performing the detection of the surrounding situation using the detection unit 32. Then, in a case where the driver expresses an intention of parking and desires to search for a place for parking, the target position determination processing by the target position determination unit 36 is started. First, a detection of an available parking space (a space in the area where the parking is permitted), that is, a parallel parking available space in the present embodiment is performed. As described above, the ultrasonic sonar configuring the distance measuring unit 16 (16a and 16d) detects the presence of the obstacle and the distance to the obstacle based on a time difference between the irradiation timing of the ultrasonic wave and the reception timing of the reflected wave.

Figure 9:
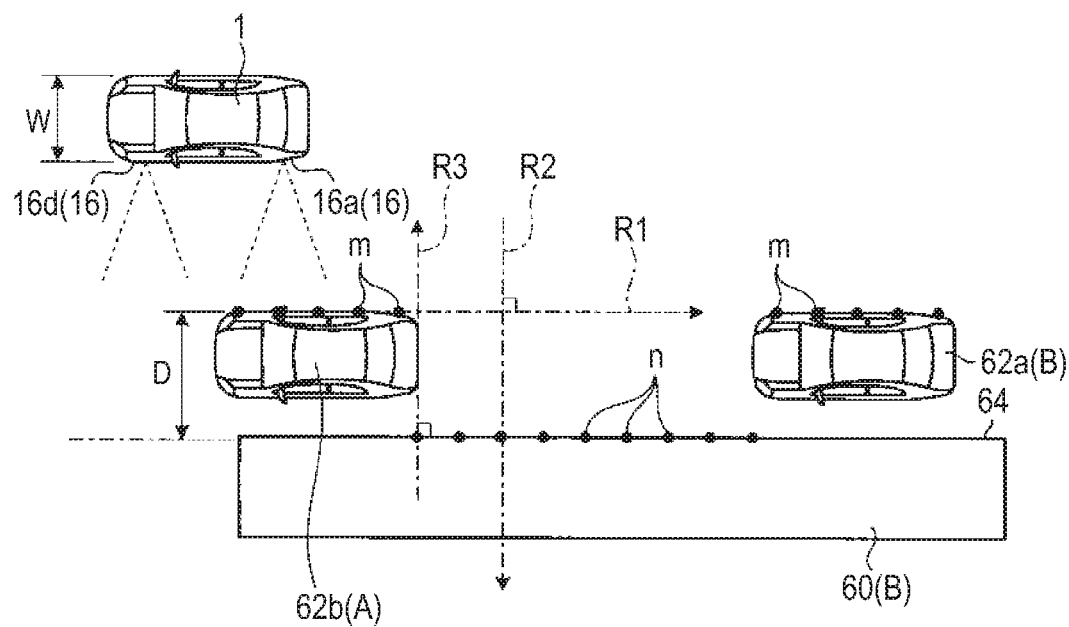
FIG. 9 is a diagram describing a method of determining a separated distance between the first obstacle and the second obstacle in the parking assistance system in the embodiment.

As illustrated in FIG. 9, in a case where the vehicle 1 performs the detection using the distance measuring unit 16 while travelling, the distance measuring unit 16 can sequentially receive a reflected wave from a vehicle 62a, a reflected wave from a depth-side obstacle 60, and a reflected wave from a vehicle 62b. Then, the detection unit 32 can detect that obstacles are present based on detected detection points m and n. In this case, the fact that the obstacles are present at a position (a position of the vehicles 62a and 62b) near the vehicle 1 (the host vehicle) and at a position (a position of the depth-side obstacle 60) far from the vehicle 1 can be detected. The detection unit 32 assumes, for example, that the obstacle being present near the vehicle 1 is a first obstacle A. In a case where the first obstacle A is an object having a side surface such as a vehicle, since a plurality of detection points m are lined up, the direction in which the detection point m extends, that is, the first obstacle A extends is assumed to be a first direction R1. In addition, as illustrated in FIG. 9, in a case where a plurality of first obstacles A (vehicles 62a and 62b) are lined up while being separated from each other, the direction in which the first obstacle A is lined up may be assumed to be the first direction R1. When the first direction R1 is determined, a direction orthogonal to the first direction R1 is assumed to be a second direction R2, and an obstacle being present at a separated position in the second direction R2, that is, an obstacle being present at a position farther from the vehicle 1 (the host vehicle) than the position of the first obstacle A is assumed to be a second obstacle B. In a case of FIG. 9, in order to make the description simple, the case is illustrated where the vehicles 62a and 62b (the first obstacles A) separated from each other are present almost parallel to the depth-side obstacle 60 (the second obstacle B) and are parked in almost a uniform state in the first direction R1. Therefore, both of a direction determined to be the direction in which the side surface of the vehicle 62b extends and a direction determined to be the direction in which the vehicles 62a and 62b are lined up are coincident with the first direction R1.

The target position determination unit 36 detects whether or not the first obstacles A separated from each other are present and the interval between the first obstacles A separated from each other based on an interval of the detected detection points m, and then, performs a detection of an entrance width of the parking available space in which the vehicle 1 can be parked in parallel. In a case where the detected entrance width is equal to or longer than a parking reference length of the vehicle 1 (a length in which margin distances of front and rear of the vehicle 1 are added to the length of the vehicle 1 in the longitudinal direction), the separated distance determination unit 54 calculates and determines the separated distance between the first obstacle A and the second obstacle B. The separated distance determination unit 54 assumes that a distance between a first surface 64 in a third direction R3 that is orthogonal to the first surface 64 which extends in the extending direction of the second obstacle B and extends in the direction vertical to the road surface and the first obstacle A, is a separated distance D. In the case of FIG. 9, since the first obstacles A are present almost parallel to the second obstacle B, the second direction R2 and the third direction R3 are almost the same (parallel).

As described above, by determining the separated distance D between the first obstacle A and the second obstacle B, it is possible to distinguish whether the vehicle 62a (62b) which is the first obstacle A is present (parked) separated from the depth-side obstacle 60 which is the second obstacle B or is present (parked) close to the depth-side obstacle 60. Therefore, the target position determination unit 36 can determine whether to cause the vehicle 1 (the host vehicle) to be present (parked) separated from the depth-side obstacle 60 or to be present (parked) close to the depth-side obstacle 60, and thus, can determine the target position for the guidance.

As described above, in a case of trying to park the vehicle 1 along the obstacle, if the obstacle is a wall having a long stature, it is desired that the vehicle 1 is guided to a position separated equal to or greater than a predetermined distance from the obstacle. For example, a side surface portion (an end portion 2d) of the vehicle 1 is made to be separated from the obstacle by a margin distance P. The margin distance P can be appropriately set, for example, to P=300 mm. Therefore, the target position determination unit 36 determines whether to guide the vehicle 1 to the position in which the space is secured equal to or longer than the margin distance P according to the separated distance D from the second obstacle B which is the depth-side obstacle 60 to the first obstacle A which is the vehicle 62a or the vehicle 62b already parked, or to guide the vehicle 1 to a position closer to the second obstacle B. For example, in a case where the separated distance D is shorter than a first distance L1, the first obstacle A is regarded to be closer to the second obstacle B. That is, the second obstacle B is a curbstone 60b or the like having a short stature and the vehicle 62b parallel parked already can also be regarded to be parked close to the curbstone 60b almost without securing the space S to the curbstone 60b as illustrated in FIG. 7. Therefore, in a case where the separated distanced D is shorter than the first distance L1 and the vehicle 1 (the host vehicle) is guided, the target position is determined such that the vehicle 1 is guided close to the second obstacle B (the curbstone 60b) without securing the space S.

On the other hand, in a case where the separated distance D is equal to or longer than the first distance L1, the second obstacle B and the first obstacle A are regarded to be separated from each other. That is, the second obstacle B is a wall 60a or the like having a long stature and the vehicle 62b parallel parked already can also be regarded to be parked separated from the wall 60a while securing the space S to the wall 60a as illustrated in FIG. 6. Therefore, in a case where the separated distance D is equal to or longer than the first distance L1 and the vehicle 1 (the host vehicle) is guided, the target position is determined such that the vehicle 1 is guided separated from the second obstacle B (the wall 60a) while securing the space S equal to or longer than the margin distance P. In a case where the parallel parking is performed, as illustrated in FIG. 9, since the vehicle 1 (the host vehicle) often enters the parking available space (a space where the driver is trying to park the vehicle 1) while once passing the space and then moving backward, the guidance for the parallel parking in the present embodiment is assumed to be performed while causing the vehicle 1 to travel backward.

Since the separated distance D is a distance between the first obstacle A and the second obstacle B, in a case where the vehicle 62b which is the first obstacle A is parked extremely separated from the second obstacle B (depth-side obstacle 60) or in a case where the vehicle 62b is a truck or the like having a wide vehicle width, the separated distance D increases. In this case, if the target position is determined such that the vehicle 1 is separated from the second obstacle B as much as the margin distance P, the vehicle 1 is guided to the depth side of the entrance of the parking available space (road side surface of the adjacent vehicle) too much, and thus, there is a case where the number of forward and backward turning operations in the parking available space increases at the time of guidance for the parking or at the time of coming out. Therefore, the target position determination unit 36 determines the target position such that the first obstacle A and the side-end portion (in the present embodiment, right side end portion 2f of the vehicle 1) of the vehicle 1 in the vehicle width direction which does not face the second obstacle B are lined up with the direction of the first direction R1 while separating the distance from the second obstacle B as much as the margin distance P in a case where the separated distance D is in a range of L1≤D≤L2, and otherwise, without considering the margin distance P. Here, it is assumed that the first distance L1 is a distance (L1=W+S1) in which a limit distance S1 to which the vehicle 1 is allowed to approach in a case where the depth-side obstacle 60 is the wall 60a or the like is added to a vehicle width W of a standard vehicle (for example, the vehicle 1), and then, it is assumed that a second distance L2 is a distance (L2=W+P) in which the margin distance P is added to the vehicle width W. The limit distance S1 differs depending on a level of a driving skill and can be determined by a pre-performed experiment or statistics, and for example, can be set to 150 mm. Therefore, it can also be said that the margin distance P is a distance in which the driver can safely perform the parallel parking along the wall 60a or the like without being affected by the level of the driving skill.

Figure 10:
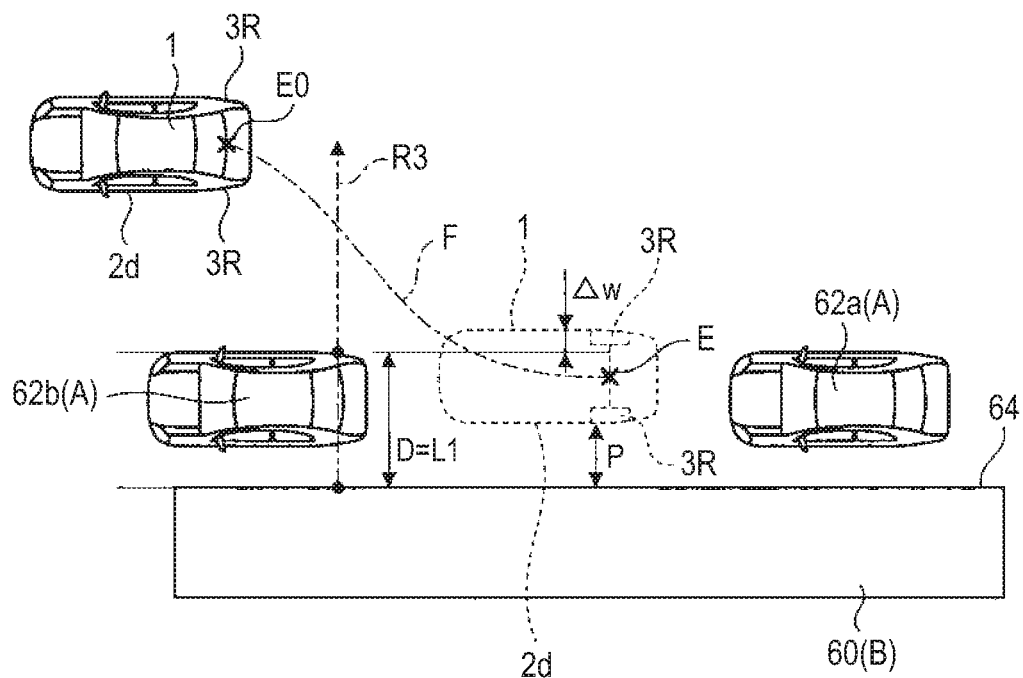
FIG. 10 is a diagram describing a guidance aspect in a case where the vehicle is guided to be separated from a predetermined distance from the second obstacle in the parking assistance system in the embodiment.
Figure 11:
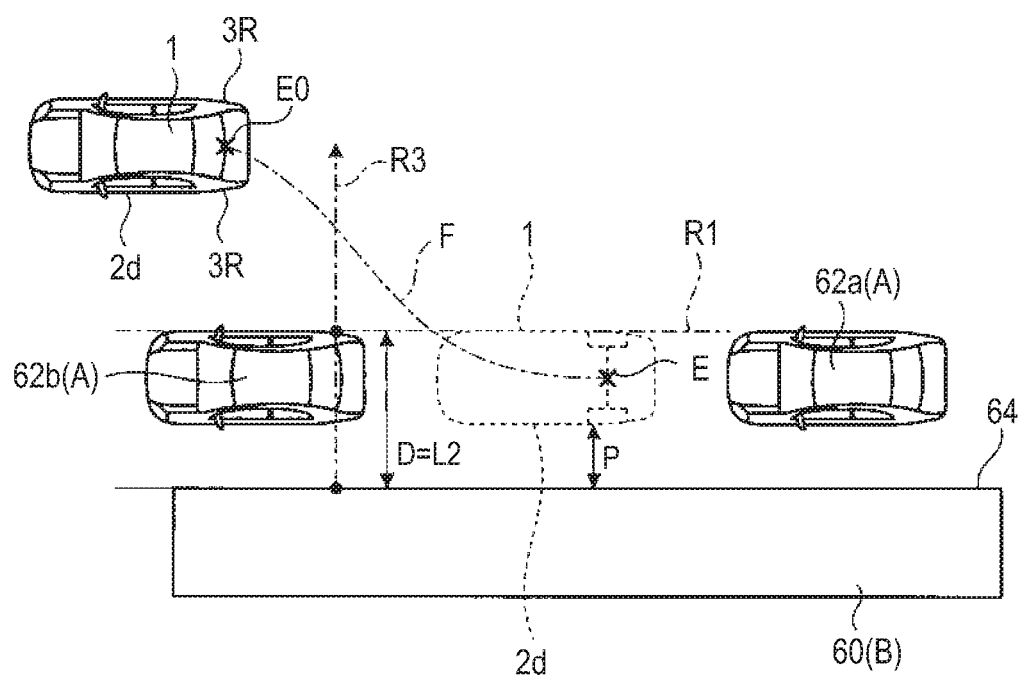
FIG. 11 is a diagram describing another guidance aspect in a case where the vehicle is guided to be separated from a predetermined distance from the second obstacle in the parking assistance system in the embodiment.

In a case where the separated distance D is in the range of L1≤D≤L2, the target position determination unit 36 determines the target position E for guiding the vehicle 1 to a position in which the left end portion 2d of the vehicle 1 is separated from the second obstacle B (the first surface 64) as much as the margin distance P. FIG. 10 illustrates the target position E in a case where the separated distance D=L1. On the other hand, FIG. 11 illustrates the target position E in a case where the separated distance D=L2. In a case of the present embodiment, in the vehicle 1, a guidance reference point E0 is provided at substantially the center portion of an axle which connects, for example, the right and left rear wheels 3R. The guidance reference point E0 is not limited to be provided on the axle, and may be provided at any position on the vehicle 1. For example, the guidance reference point E0 may be set on the left rear wheel 3R of the vehicle 1 and then, may set the target position E at the position where the left rear wheel 3R of the vehicle 1 is predicted to be present at the time of completing the parking. The route calculation unit 38 performs the calculation of the guidance route F for guiding such that the guidance reference point E0 substantially coincides with the target position E. For the calculation of the guidance route F, various known calculation methods can be used, and a detailed description thereof will be omitted.

Then, when the guidance route F is determined, the guidance control unit 40 of the CPU 14a performs guidance control processing by automatic steering using the steering system 13 and the travelling using creeping. In a case where the vehicle 1 is an electric vehicle or a hybrid vehicle, the guidance may be performed by causing the vehicle 1 to travel at a low speed by controlling a motor. Prior to the starting of the guidance control, the output information determination unit 42 of the CPU 14a may perform the operation of starting the parking assistance or operation of requesting the driver during the assistance such as an operation for instructing the driver to switch the forward and backward by the lever shifting operation or to adjust the speed.

In a case of the present embodiment, in a case where the first surface 64 of the second obstacle B can be detected by the distance measuring unit 17, the guidance control unit 40 may set a guidance completion condition so as to guide the vehicle 1 along the first surface 64. Then, the guidance control unit 40 includes the guidance completion condition for the parking assistance. The examples of the guidance completion conditions include a condition where the central axis in the longitudinal direction of the vehicle 1 is substantially parallel (within a predetermined angular error) to a first surface at the time of the completion of parking, and a condition where a deviation of the guidance reference point E0 and the target position E in the vehicle width direction and a deviation thereof in the longitudinal direction of the vehicle are respectively within a predetermined range. In addition, a fact that the steering angle is within a predetermined range (for example, oriented in the almost straight forward direction) or the like may be included in the guidance completion condition. In a case of the parallel parking, the guidance completion condition of the guidance reference point E0 and the target position E in the vehicle width direction is set looser than in a case of the guidance completion condition in a longitudinal direction of the vehicle. Therefore, the forward and backward turning operations may not be performed many times in order to correct the deviation in the vehicle width direction in the parallel parking space.

Figure 12:
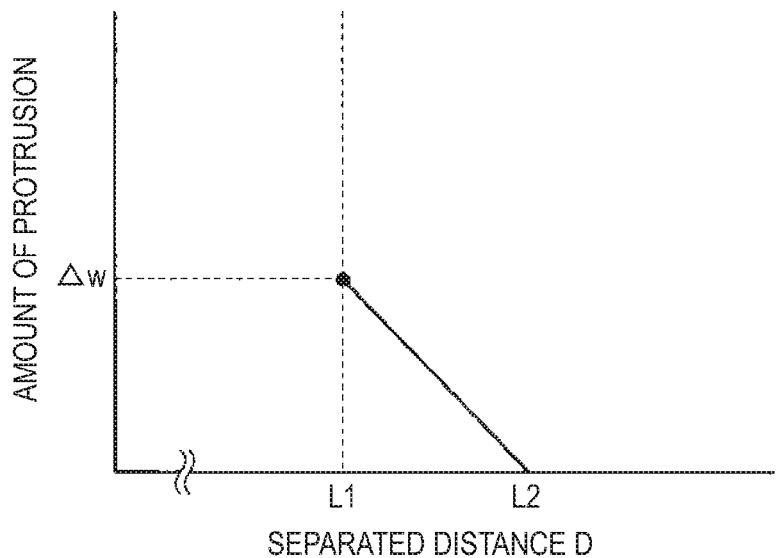
FIG. 12 is a diagram describing an amount of protrusion of another side-end portion of the vehicle protruded from the first obstacle in a case where one side-end portion of the vehicle secures a predetermined distance to the second obstacle in the parking assistance system in the embodiment.

Incidentally, as described above, since the margin distance P is set longer than the limit distance S1 to which the vehicle 1 is allowed to approach in a case where the depth-side obstacle 60 is the wall 60a or the like, if the vehicle widths of the vehicle 1 and the vehicle 62b (62a) are the same, in a case where the vehicle 1 is guided to the target position E when D=L1, there is a case where the vehicle 1 protrudes to the travelling roadside with respect to the first obstacle A as much as a protrusion amount Δw as illustrated in FIG. 10. On the other hand, when D=L2, the first obstacle A and the end portion 2d of the vehicle 1 are almost lined up in a line in the first direction R1 as illustrated by a dotted line in FIG. 11. A relationship between this protrusion amount Δw and the separated distance D is as illustrated in FIG. 12, the protrusion amount Δw has a maximum value when the separated distance D is the first distance L1 and gradually decreases while the separated distance D increases, and becomes "0" when the separated distance D is the second distance L2. This protrusion amount Δw can be adjusted depending on the setting of the margin distance P. Usually, since a depth direction width of the region where the parking is allowed is set with a sufficient margin considering the vehicles having various vehicle widths, even when the parking situation is as illustrated in FIG. 11 while giving a priority to the securing of the margin distance P, there is no particular problem. However, a message proposing the driver to recheck the parking position according to the protrusion amount Δw may be provided by, for example, the voice control unit 14e or the like.

As described above, in a case where the separated distance D is longer than the first distance L1, it is possible to reliably separate the vehicle 1 from the second obstacle B by a predetermined distance (the margin distance P). That is, even in a case where the second obstacle B cannot be detected as an obstacle having a long stature by the detection using the distance measuring unit 17, it is possible to estimate that the second obstacle B is an obstacle having a long stature based on the separated distance D between the first obstacle A and the second obstacle B. Thus, it is possible to guide the vehicle 1 so as to be parked in a state suitable for the situation in the parallel parking space while reliably separating the vehicle 1 from the second obstacle B as much as the margin distance P.

Figure 13:
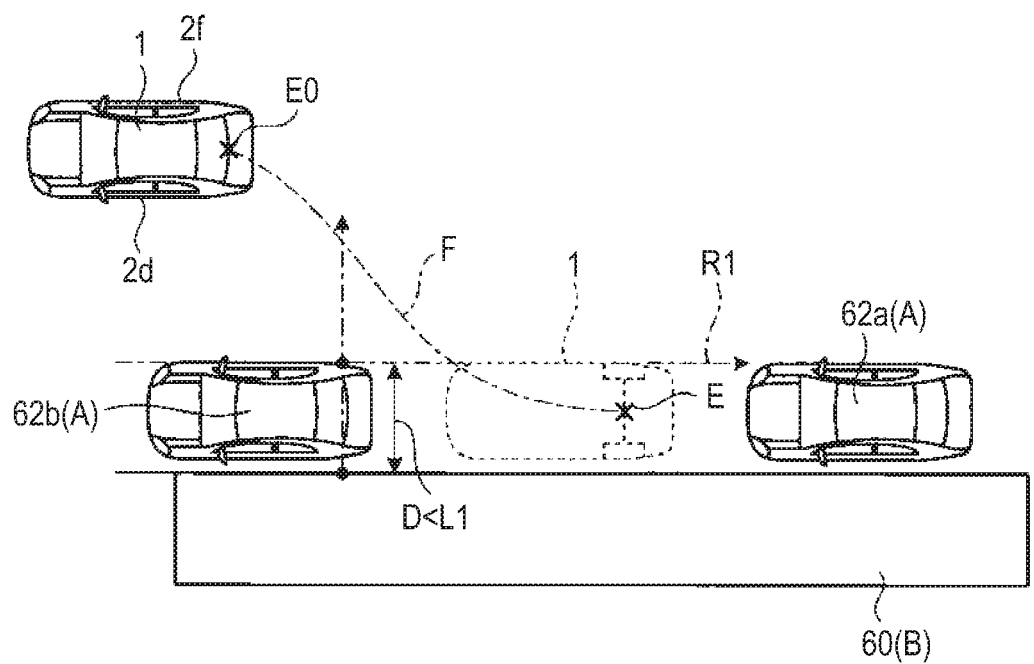
FIG. 13 is a diagram describing a guidance aspect in a case of guiding the vehicle to be close to the second obstacle in the parking assistance system in the embodiment.

On the other hand, in a case where the separated distance D is not in the range of L1≤D≤L2, for example, in a case where the separated distance D is in the range of D<L1, the first obstacle A can be regarded as approaching the second obstacle B as illustrated in FIG. 13. That is, it can be regarded that the second obstacle B is the curbstone 60b or the like having a short stature and the vehicle already parked in parallel is parked close to the curbstone 60b almost without a space S to the curbstone 60b as illustrated in FIG. 7. Depending on the separated distance D, it can be regarded that the vehicle 1 is parked over the curbstone 60b. Therefore, in a case of guiding the vehicle 1 (the host vehicle), the target position E is determined such that the first obstacle A and the right side end portion 2f of the vehicle 1, that is, the side end portion in the vehicle width direction which does not face the second obstacle B are lined up with the direction of the first direction R1. As described above, by guiding the end portion 2f of the vehicle 1 (the host vehicle) so as to be lined up with the first obstacle A, it is possible to guide the vehicle 1 to be parked close to the second obstacle B similarly to the vehicle 62b already parked in parallel along the second obstacle B.

As described above, in a case where the separated distance D is equal to or shorter than the first distance L1, it is possible to guide the vehicle 1 without excessively separating the vehicle 1 from the second obstacle B. That is, even in a case where the second obstacle B cannot be detected as an obstacle having a short stature by the detection using the distance measuring unit 17, it is possible to estimate that the second obstacle B is an obstacle having a short stature based on the separated distance D between the first obstacle A and the second obstacle B. Thus, it is possible to guide the vehicle 1 so as to be parked in a state suitable for the situation in the parallel parking space while causing the vehicle 1 to be sufficiently close to the second obstacle B.

Figure 14:
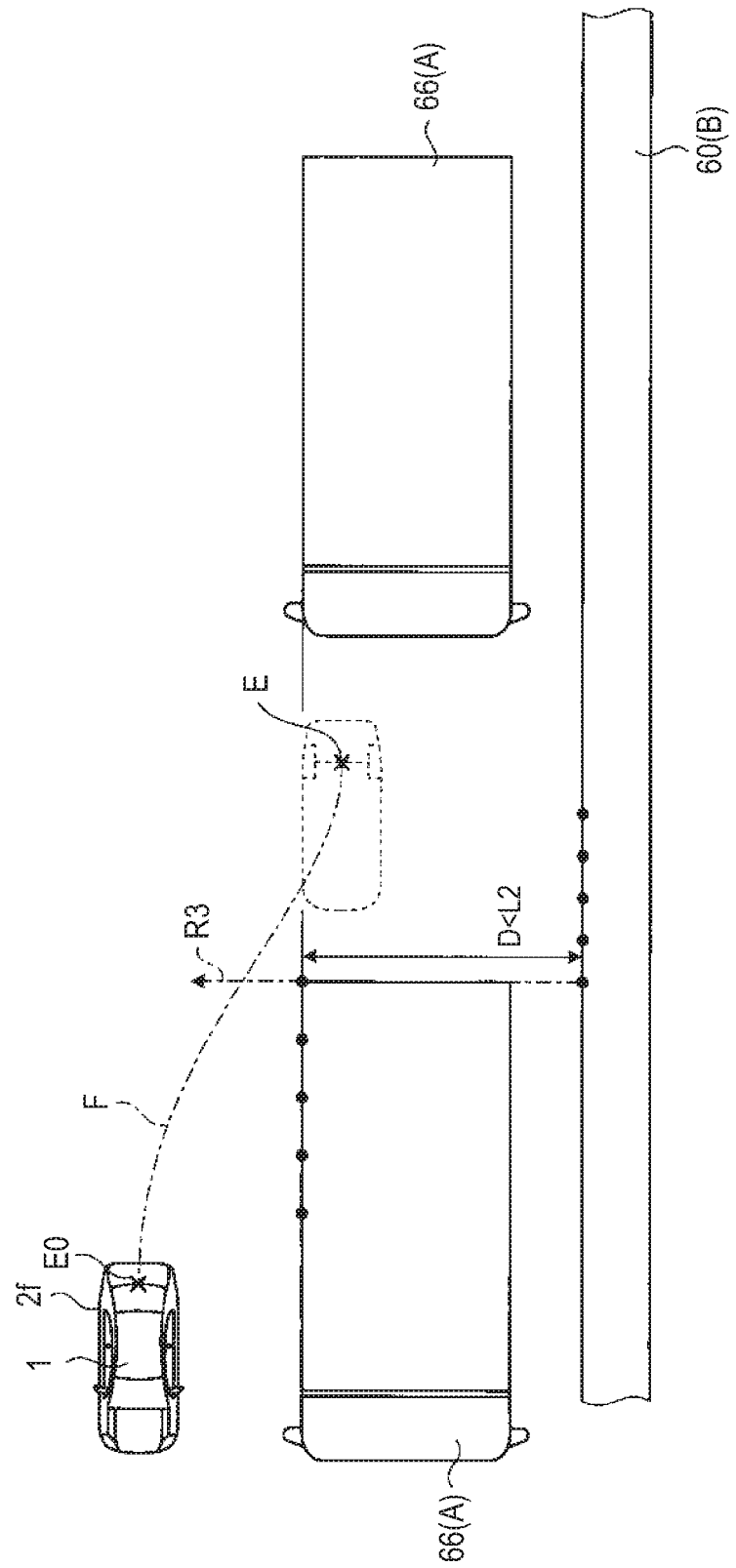
FIG. 14 is a diagram describing a guidance aspect in a case of guiding the vehicle (host vehicle) between big first obstacles (for example, trucks) in the parking assistance system in the embodiment.

In addition, in a case where the separated distance D is in the range of D>L2, for example, it can be regarded that the first obstacle A is greatly separated from the second obstacle B. For example, as illustrated in FIG. 14, a case can be considered where the vehicle 66 (the first obstacle A) which is already parked in parallel is a vehicle having a wide vehicle width such as a truck. In this case, the target position E is determined such that the end potion 2f of the vehicle 1 (the host vehicle) is guided so as to be lined up with the first obstacle A (so as to be lined up with the first direction R1). In a case of guiding the vehicle 1, if there is a margin in the depth direction of the parking available space, even when the guidance is performed so as to secure the margin distance P, there occurs no particular problem of the contact with the obstacle or in the opening and closing of the door. However, as described above, in a case of guiding the vehicle 1 to the deep parking available space in the depth direction formed by the vehicle 66 (the truck), when the vehicle 1 is to approach the second obstacle B, and in some cases, a multiple number of forward and backward turning operations are required depending on the calculated guidance route. Similarly, in a case where the vehicle 1 is to come out from the deep parking available space in the depth direction, a multiple number of forward and backward turning operations are required or it may become difficult to start because a starting angle is too sharp with respect to the travelling road. In order to avoid the problems described above, in a case of D>L2, the guidance is performed such that the end portion 2f of the vehicle 1 (the host vehicle) is lined up with the first obstacle A (lined up with the first direction R1). That is, the guidance is performed so as to make a state in which the end portion 2f of the vehicle 1 (side-end portion) does not protrude in the third direction R3 from a farthest portion of the first obstacle A in the third direction R3 (a state in which the vehicle 1 is completely parked within the parking available space).

As described above, in a case where the separated distance D is longer than the second distance L2, the target position E for the guidance is set such that at least the vehicle 1 does not protrude from another vehicle and the entry and coming out of the vehicle 1 can easily be performed. As a result thereof, it is possible to guide the vehicle 1 so as to be parked in a state suitable for the situation in the parallel parking space.

Figure 15:
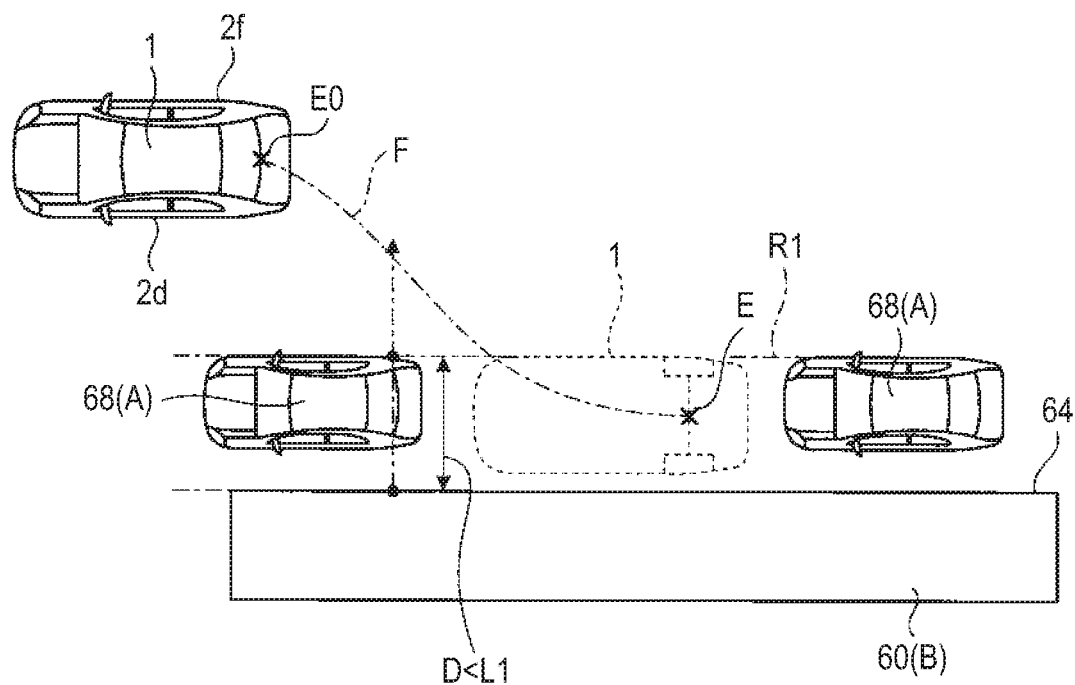
FIG. 15 is a diagram describing a case where a problem occurs in a case of guiding the vehicle (host vehicle) between small first obstacles (for example, light vehicles) in the parking assistance system in the embodiment.

Incidentally, there is a case where the vehicle 68 which is already parked in parallel is a vehicle having a narrow vehicle width (for example, a light car). The vehicle width of the light car is narrower than that of an ordinary vehicle 1 (a standard-sized vehicle) by equal to or more than 300 mm. For example, there is a case where the vehicle 68 is parked sufficiently separated from the second obstacle B. That is, there is a case where the light car is parked in a state of securing the space S while recognizing that the second obstacle B is the wall 60a. However, even in this case, there is a case where the separated distance D between the first obstacle A and the second obstacle B becomes to be in the range of D<L1. That is, as illustrated in FIG. 15, there is a case where the CPU 14a erroneously recognizes that the vehicle 1 is parked close to the second obstacle B, that is, erroneously recognizes that the second obstacle B is the obstacle having a short stature such as a curbstone 60b. Then, in a case of guiding the vehicle 1 (the host vehicle) as illustrated in FIG. 15, the target position E is determined such that the first obstacle A and the right end portion 2f of the vehicle 1, that is, the side-end portion in the vehicle width direction which does not face the second obstacle B are lined up in the first direction R1. As a result thereof, there is a case where the vehicle 1 is guided to an inappropriate position.

Figure 16:
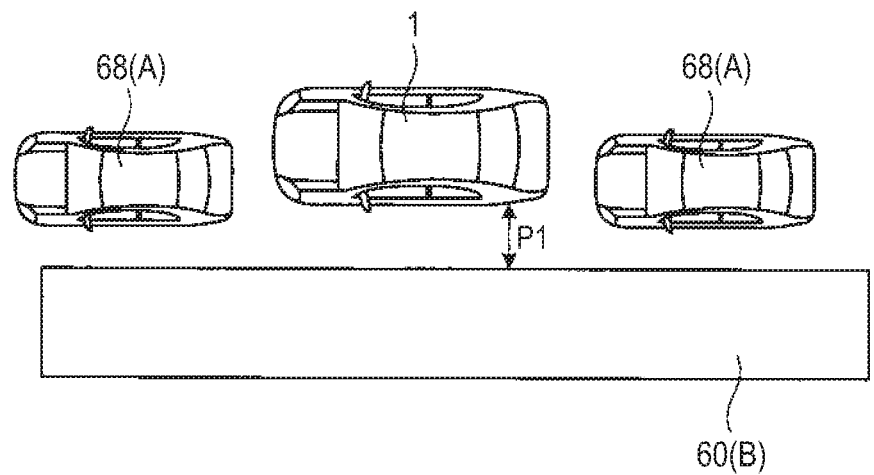
FIG. 16 is a descriptive diagram describing an example of avoiding the problem which occurred in FIG. 15.

In a case of the parking assistance system 100 in the present embodiment, during the guidance of the vehicle 1 along the guidance route F, in a case where the depth-side obstacle 60 is the wall 60a having a long stature, the distance measuring unit 17a detects the depth-side obstacle 60 as an approaching obstacle. In this case, the CPU 14a performs contact avoidance processing such that the vehicle 1 does not come in contact with the obstacle. For example, as illustrated in FIG. 16, the guidance of performing the forward and backward turning operations is performed such that the vehicle 1 is separated from the second obstacle B which is the depth-side obstacle 60 as much as the predetermined distance P1. In this case, the target position determination unit 36 may calculate a new target position E for avoiding the second obstacle B and the route calculation unit 38 may calculate a new guidance route F, or the avoidance of the second obstacle B may be performed by an avoidance operation (for example, the forward and backward turning operations) without modifying the target position E and the guidance route F. In a case illustrated in FIG. 15, the second obstacle B is an obstacle having a short stature such as the curbstone 60b, and there is no problem even when the vehicle 1 approaches the second obstacle B. That is, there is no problem even when the vehicle 1 is guided to the position as illustrated in FIG. 15. In this case, if the distance measuring unit 17a is set so as not to detect an obstacle having a short stature, the guidance control unit 40 performs the guidance along the guidance route F which is initially calculated. As described above, an erroneous detection by the distance measuring unit 16 can be corrected using the distance measuring unit 17a, and it is possible to perform appropriate guidance for the parallel parking.

As described above, according to the parking assistance system 100 in the present embodiment, even in a case where the height of the depth-side obstacle 60 cannot be detected, the target position E for the guidance can be determined based on the position relationships (the separated distance D) between a plurality of obstacles (the first obstacle A, the second obstacle B (the depth-side obstacle 60)). Then, it is possible to guide the vehicle 1 so as to be parked at an appropriate position similar to the first obstacle A (another vehicle parked in parallel). In addition, even in a case where an error occurs in determining the target position E based on the separated distance D, the error can be corrected by detecting the state of approaching the obstacle, and it is possible to complete the safe guidance of the vehicle 1 and to guide the vehicle 1 to an appropriate position.

Figure 17:
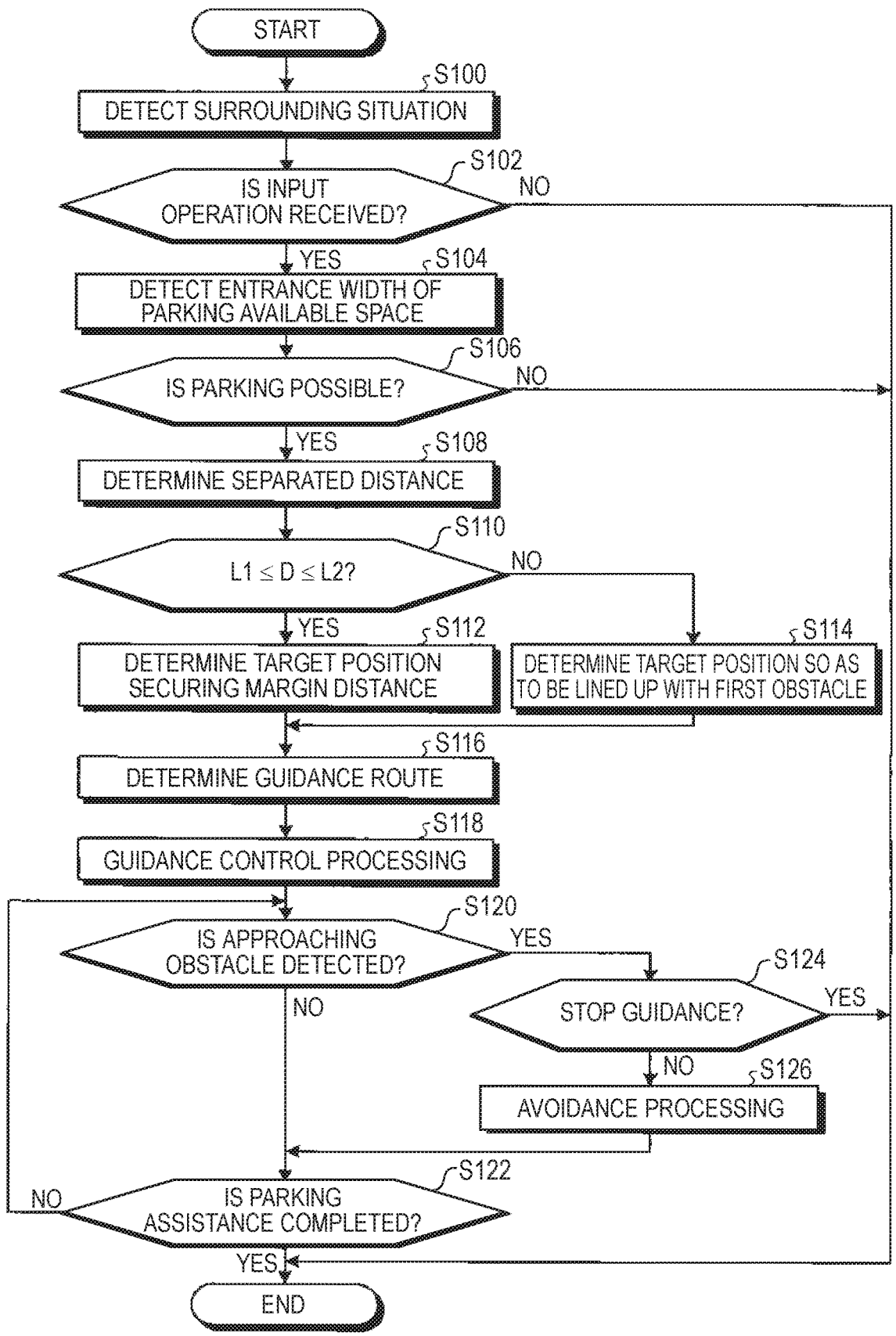
FIG. 17 is a flowchart describing parking guidance processing in the parking assistance system in the embodiment.

Hereinafter, an example of processing in which a parking assistance device (the parking assistance system 100) in the present embodiment guides a host vehicle (the vehicle 1) to an appropriate position based on the surrounding condition will be described using a flowchart in FIG. 17.

First, the detection unit 32 detects an obstacle around the vehicle 1 or border lines, partition lines or the like on a road surface based on the information provided from the imaging unit 15 or the distance measuring units 16 and 17 during the travelling or stop of the vehicle 1 (S100). For example, as illustrated in FIG. 8, the detection of the obstacle is performed using the distance measuring units 16 (16a and 16d) during the moving of the vehicle 1. The distance measuring unit 16 is configured with an ultrasonic sonar, and thus, the detection unit 32 detects the presence of the obstacle at the side of the vehicle 1 (the host vehicle) and the distance to the obstacle.

The CPU 14a waits for receiving an operation input requesting to start the parking assistance via the operation receive unit 34. In a case where the input operation is not received (No in S102), the process temporarily ends. That is, the CPU 14a performs the construction of information for detecting the surrounding situation using the detection unit 32. On the other hand, in a case where the input operation is received in S102, (Yes in S102), that is, in a case where the user expresses an intention of parking and desires to search for a place for parking, the target position E determination processing by the target position determination unit 36 is started. First, the target position determination unit 36 performs the detection of the parking available space. As described above, the target position determination unit 36 detects whether or not the first obstacles A are present, which are separated from each other, and detects the intervals between the first obstacles A being separated from each other based on the interval of the detected detection point m, and then, performs the detection of the entrance width of the parking available space (S104). Then, in a case where the detected entrance width is narrower than the parking reference length of the vehicle 1, the target position determination unit 36 determines that the parking is not possible (No in S106), and the process temporarily ends. In this case, for example, the CPU 14a may issue an instruction to the voice control unit 14e, and may output a message saying "parking is not possible, please search for another place".

On the other hand, in S106, in a case where the parking is possible (Yes in S106), that is, in a case where the detected entrance width is equal to or greater than the parking reference length of the vehicle 1, the separated distance determination unit 54 calculates and determines the separated distance D between the first obstacle A and the second obstacle B (S108).

In a case were the separated distance D is in the range of $L1 \leq D \leq L2$ (Yes in S110), it can be regarded by the target position determination unit 36 that the second obstacle B is the wall 60a or the like having a long stature. Therefore, the target position E for guiding the vehicle 1 is determined at such a position that the left end portion 2d of the vehicle 1 is separated from the second obstacle B (the first surface 64) as much as the margin distance P (S112). On the other hand, in a case were the separated distance D is not in the range of $L1 \leq D \leq L2$ (No in S110), that is, in a case of D<L1 or D>L2, the target position E is determined such that the first obstacle A and right side end portion 2f of the vehicle 1, that is, the end portion 2f which is the side-end portion in the vehicle width direction which does not face the second obstacle B, are lined up with the direction of the first direction R1 without considering the margin distance P in a case of guiding the vehicle 1 (S114).

When the target position E for guiding the vehicle 1 is determined, the route calculation unit 38 performs the calculation of the guidance route F for guiding such that the guidance reference point E0 substantially coincides with the target position E (S116). When the guidance route F is determined, the guidance control unit 40 of the CPU 14a performs guidance control processing by automatic steering using the steering system 13 and the travelling using creeping (S118).

Figure 18:
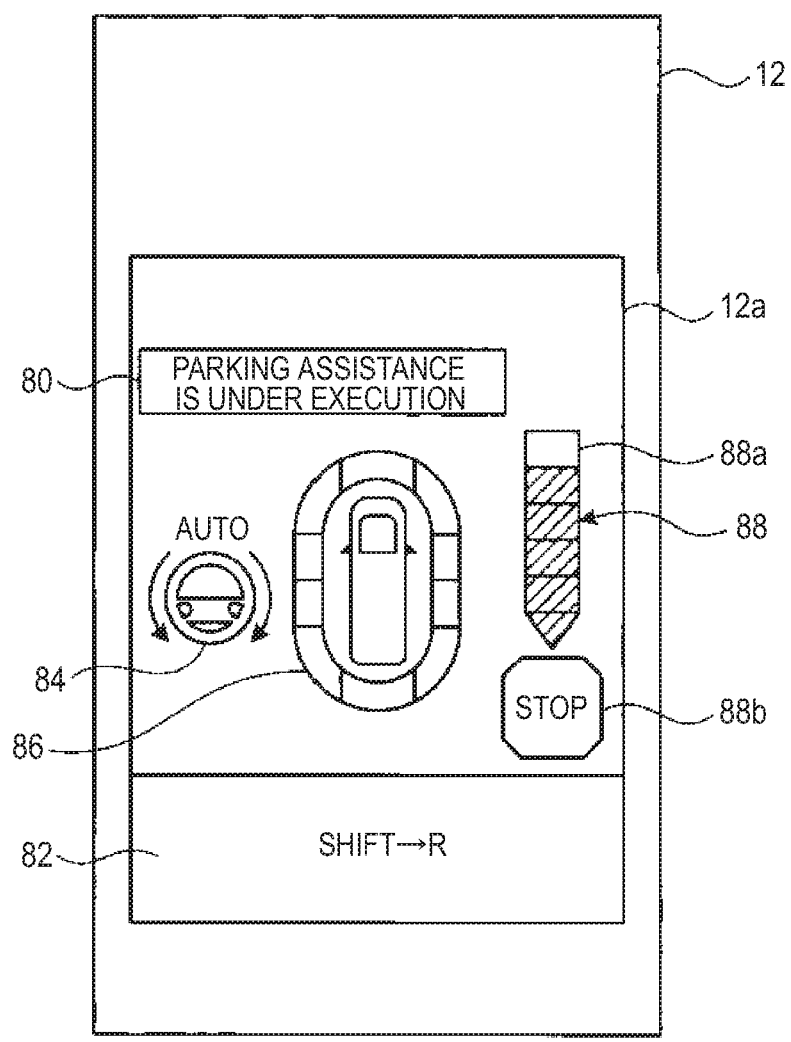
FIG. 18 is an example of a screen of a display device that displays information relating to the guidance, and illustrates a display example of the parking assistance in the parking assistance system in the embodiment.

In this case, for example, as illustrated in FIG. 18, a screen 12a that indicates the fact that the execution of the guidance control is started or is under execution may be displayed on the display device 12. The screen 12a is an example, and includes a first display area 80 and a second display area 82 that display the control state during the parking assistance control and an operation instruction to the driver. During the parking assistance control, for example, a message "parking assistance is under execution" is displayed on the first display area 80. The display may be displayed in a flashing display or in a highlight color such as a red color in order to get the driver's attention. In addition, on the second display area 82, for example, a message saying "shift to the right" is displayed, which indicates the starting of the guidance of the backward driving and urges the user to operate the shift lever. In this case also, the display may be displayed in a flashing display or in a highlight color in order to get the driver's attention. In addition, a steering symbol 84 which indicates that the automatic steering control is under execution, a surroundings detection symbol 86 which indicates whether or not a notable obstacle is present around the vehicle 1, and a completion indicator 88 which indicates an approximate time to the completion of the parking assistance, are displayed. The steering symbol 84 is turned on so as to notify the execution of the automatic steering control in a case where the steering control is executed by the guidance control unit 40. In addition, the steering symbol 84 may be displayed in a rotation angle corresponding to the actual steering angle. The surroundings detection symbol 86 has a configuration in which an individual symbol is arranged around a vehicle symbol, and in a case where an obstacle is present within a warning distance set in advance based on the result of detection by the detection unit 32, can be configured such that the individual symbol indicating that an obstacle is present is turned on. For example, as described using FIG. 15, the target position E set based on the separated distanced D is not appropriate and in a case where the vehicle 1 approaches the second obstacle B (wall 60a) or the like closer than the warning distance, the surroundings detection symbol 86 is turned on to give a warning. The individual symbol may be configured to be displayed in "blue" at normal time, and to be changed from "blue" to "red" in a case where the obstacle for warning is detected. The completion indicator 88 includes an indicator 88a that indicates a period from the time when the number of lightings of the individual blocks indicating the unit time increases or decreases to the time when the guidance is completed and a target symbol 88b that indicates the completion of the guidance. The content of the display on the screen 12a is an example, and the displaying item may be changed or the displaying mode may be changed, if necessary.

The CPU 14a detects whether or not an obstacle approaches the vehicle 1 closer than a predetermined distance (approaching distance, warning distance) using the distance measuring unit 17 at all times while the guidance control unit 40 executes the guidance of the vehicle 1. Then, in a case where the approaching obstacle is not detected by the distance measuring unit 17 (No in S120), as a result of the guidance, the guidance control unit 40 confirms that the guidance completion condition is satisfied, and in a case where the guidance completion condition is satisfied (Yes in S122), a series of parking assistance is completed. In this case, in the first display area 80 on the screen 12a illustrated in FIG. 18, a message saying that the parking assistance is completed, for example, "parking assistance completed, please carefully exit the vehicle" or the like may be displayed.

In addition, in S122, in a case where the guidance completion condition is not yet satisfied (No in S122), the process returns to S120 and the processing items subsequent to S120 are continued to be processed.

In addition, in the processing in S120, in a case where an approaching obstacle is detected by the distance measuring unit 17 (Yes in S120), the guidance control unit 40 determines whether or not to stop the guidance (S124). For example, in a case where the vehicle 1 can be in the parking available space in a state of being parallel to the second obstacle B and the first obstacle A by only one time of forward and backward turning operations, it is determined that the guidance is not necessary to be stopped (No in S124), and avoidance processing is executed for executing the forward and backward turning operations (S126). In this case, the process proceeds to S122. However, it is preferable to make the guidance completion condition be loose compared to the case where the avoidance processing is not performed so that a situation in which the parking assistance does not easily end occurs due to the continuous operation of the forward and backward turning operations. For example, in a case where the vehicle 1 protrudes from the first obstacle A while being separated from the second obstacle B by equal to or longer than a margin distance P by loosening a degree of coincidence between the guidance reference point E0 of the vehicle 1 in the vehicle width direction and the target position E, if the protrusion is within an allowable range set in advance and the vehicle 1 is almost parallel to the second obstacle B, the parking is regarded to be completed and the assistance may be completed. On the other hand, in a case where the guidance control unit 40 determines that it is necessary to stop the guidance in S124, for example, in a case where it is required to execute the forward and backward turning operations in a plurality of times in order to avoid the obstacle detected by the distance measuring unit 17, the guidance is stopped (Yes in S124) and the flow ends. In this case, a message indicating that the parking assistance is stopped, for example, a message saying "parking assistance is stopped" may be displayed in the first display area 80 on the screen 12a illustrated in FIG. 18. In addition, a guide to safely start from the current position and to search for another parking available space may be performed.

Figure 19:
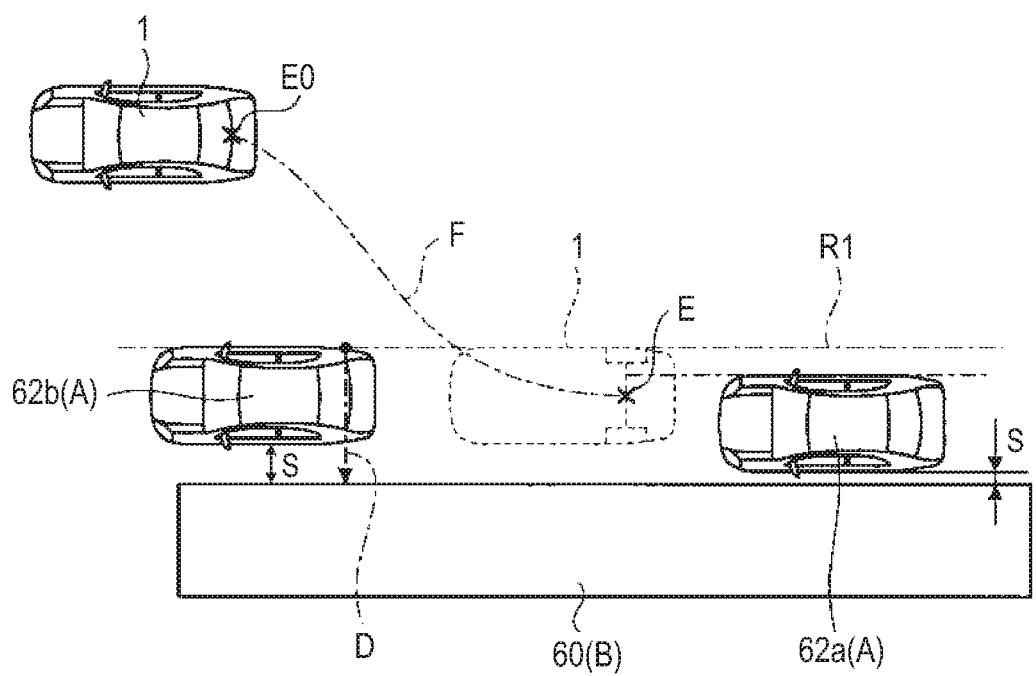
FIG. 19 is a diagram describing a guidance aspect of guiding the vehicle in a case where approaching states of first obstacles separated in a line to the second obstacle are different from each other, in the parking assistance system in the embodiment.

Incidentally, a plurality of vehicles 62 are parked in parallel separated from each other in a line along the depth-side obstacle 60, although those vehicles 62 are not necessarily parked equally separated from the second obstacle B. For example, there is a case where the degree of approaching the depth-side obstacle 60 is different depending on a driving skill of the driver. Specifically, as illustrated in FIG. 19, there is a case where it is desired to park the vehicle 1 in parallel between two vehicles parked in a line separated from each other; that is, the vehicle 62a that is parked in a state of having almost no space S to the depth-side obstacle 60 and the vehicle 62b that is parked in a state of securing sufficient space S to the second obstacle B. In this case, there is a case where it is not determined whether the parking of the vehicle 62a without securing the space S is appropriate or the parking of the vehicle 62b securing the sufficient space S is appropriate. In this case, the vehicle 62b which is near the vehicle 1 (the host vehicle) may be regarded as the first obstacle A. Then, the first direction R1 is determined based on the selected vehicle 62b. That is, the first obstacle A is set in such a manner that the separated distance D becomes long. As a result thereof, the target position E of the vehicle 1 is easily set to the position separated from the second obstacle B, and thus, the control of the safety side becomes possible.

Figure 20:
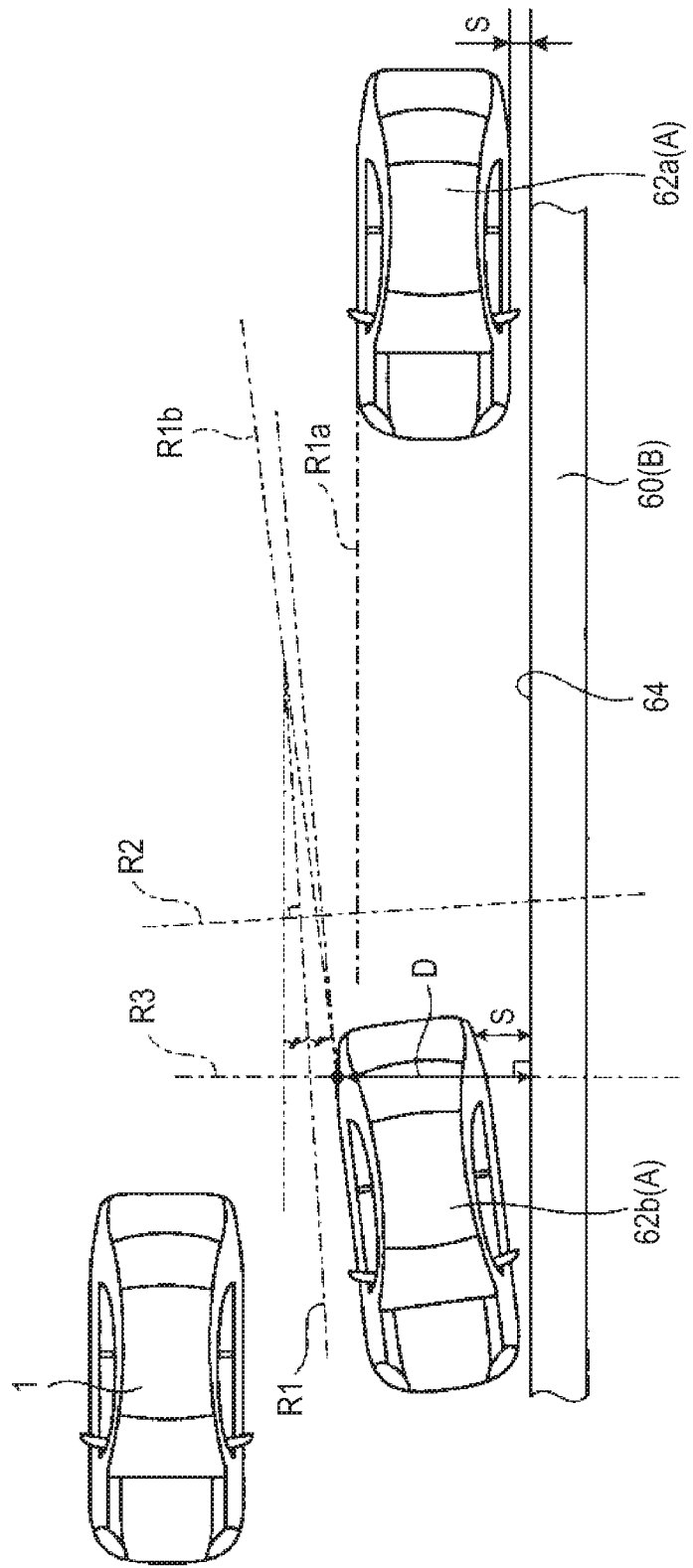
FIG. 20 is a diagram describing a guidance aspect of guiding the vehicle in a case where first obstacles separated in a line are present in an angle different with respect to the second obstacle, in the parking assistance system in the embodiment.

Similarly, in a case where a plurality of vehicles 62 are parked in parallel separated from each other in a line along the depth-side obstacle 60, as illustrated in FIG. 20, there is a case where at least one of the vehicle 62a and the vehicle 62b is parked in an oblique posture against the depth-side obstacle 60. In this case also, there is a case where it is difficult to determine whether the parking of the vehicle 62a while securing not so much space S is appropriate or the parking of the vehicle 62b securing a certain degree of space S in spite of the oblique posture is appropriate. In this case also, similarly to the case in FIG. 19, the vehicle 62b which is near the vehicle 1 (the host vehicle) may be regarded as the first obstacle A. However, the first direction R1 can be set as a direction indicated by an average angle of the angles between the extending direction R1a of each of the first obstacles A and the angle indicated by the direction R1b. Therefore, the second direction R2 is a direction orthogonal to the first direction R1 obtained from averaging. The third direction R3 is a direction orthogonal to the first surface 64 determined by the second obstacle B, and the separated distance D is a determined distance between the first obstacle A (vehicle 62b) and the first surface 64. In this case also, the first obstacle A can be set in such a manner that the separated distance D becomes long. As a result thereof, the target position E of the vehicle 1 is easily set to the position separated from the second obstacle B, and thus, the control of the safety side becomes possible. In addition, by guiding the vehicle 1 such that the direction of the end portion 2f of the vehicle 1 (the host vehicle) is lined up to the first direction R1 obtained from averaging, a protrusion or dent of each vehicle to the road surface side goes unnoticed, and thus, it can contribute to a balance of entirety of parallel parking.

In a case where the first obstacle A is present in the oblique posture against the second obstacle B (the posture of the vehicle 62b in FIG. 20), when the first obstacle A and the right end portion 2f of the vehicle 1 are lined up in the direction of the first direction R1 determined by averaging, there is a case where the vehicle 1 largely protrudes to the travelling road compared to the vehicle 62b depending on the size of the oblique angle. In this case, in a case where the separated distance D between the first obstacle A and the second obstacle B is longer than the second distance L2, the end portion 2f of the vehicle 1 is set so as not to protrude to the third direction R3 against the farthest portion (the most protruded portion to the travelling road side) of the first obstacle A in the third direction R3. That is, the end portion 2f of the vehicle 1 which is lined up in the first direction R1 determined by averaging is made to be slid to the second obstacle B side (the first surface 64 side). For example, the farthest portion of the vehicle 62b lined up to the first direction R1b and the farthest portion of the vehicle 1 lined up in the first direction R1 determined by averaging are set to be lined up in the direction along the first surface 64. In this way, even in a case where the first obstacle A is inclined to the second obstacle B, it is possible to perform a well-balanced guidance of the vehicle 1 to another vehicle (the first obstacle A) by determining the target position E.

In addition, there is a case where the depth-side obstacles 60 (the second obstacles B) are curbs lined up while being separated from each other or a fence or trees lined up and being separated from each other. In this case, the separated distance D may be determined by defining the first surface 64 and the third direction R3 based on the line-up direction of the second obstacles B.

In the embodiment described above, an example is described as a parking assistance, in which the guidance control unit 40 automatically executes the steering control corresponding to the guidance route F for parking and guides the vehicle 1 to the target position E while travelling by the driving force using creeping. In another embodiment, a parking assistance device having an aspect of executing the guidance along the calculated guidance route F by only the guidance guide using the display or voice and not executing the automatic steering control or the like, can be included as an aspect of the parking assistance device. That is, a case of a type of parking assistance device in which a steering direction, an amount of steering, an amount of operation of the accelerator pedal or a brake pedal, or an operation timing is provided to the user by a display or by voice, and the actual travelling operation is delegated to the user, can be included in the embodiment described above, and it is possible to obtain the same effects.

In the configuration, a parking assistance program which is executed by the target position determination unit 36, the guidance control unit 40, the output information determination unit 42, or the like in the present embodiment may be provided as an installable format or an executable format by being recorded in a computer-readable recording medium such as a CD-ROM, a flexible disk (FD), a CD-R, or a digital versatile disk (DVD).

Furthermore, in the configuration, the parking assistance program which is executed by the target position determination unit 36, the guidance control unit 40, the output information determination unit 42, or the like in the present embodiment may be stored in a computer connected to a network such as the Internet and may be provided by being downloaded via the network. In addition, in the configuration, the parking assistance program which is executed by the target position determination unit 36, the guidance control unit 40, the output information determination unit 42, or the like in the present embodiment may be provided or distributed via a network such as the Internet.

In the present embodiment, an example of the notification of the parking assistance being executed using the screen 12a displayed on the display device 12 is described. However, in another embodiment, the notification having the same content may be executed through a voice using the voice output device 9. By executing the information provided on the screen 12a and the information provided by voice together, it is possible to provide the user with an easy-to understand parking assistance.

A parking assistance device according to an embodiment includes: for example, an obstacle detection unit that detects an obstacle; a separated distance determination unit that determines a separated distance between the obstacles in a case where a plurality of the obstacles are detected; a target position determination unit that determines a target position in a guidance route; a route calculation unit that calculates the guidance route; and a control unit that guides a vehicle in accordance with the guidance route. In a case where a second obstacle is detected in a second direction which is orthogonal to a first direction in which a first obstacle extends or a plurality of first obstacles are lined up while being separated from each other and the second obstacle is detected at a position separated from the first direction, the separated distance determination unit determines the separated distance between the first obstacle and the second obstacle. The target position determination unit determines a target position which is lined up with the first obstacle in the first direction and the target position which overlaps the second obstacle or is adjacent to the second obstacle, determines the target position such that the first obstacle and a side-end portion of the vehicle in a vehicle width direction which does not face the second obstacle are lined up in the first direction, in a case where the separated distance between the first obstacle and the second obstacle is shorter than a first distance, and determines the target position such that the vehicle is separated by equal to or longer than a predetermined distance from the second obstacle, in a case where the separated distance between the first obstacle and the second obstacle is equal to or longer than the first distance. According to this configuration, for example, in a case where the detected separated distance between the first obstacle and the second obstacle is shorter than the first distance, it means that the first obstacle is close to the second obstacle. Conversely, in a case where the separated distance between the first obstacle and the second obstacle is equal to or longer than the first distance, it means that the first obstacle is away from the second obstacle. Therefore, by determining the target position for guiding the vehicle using positional relationships between the first obstacle and the second obstacle, it is possible to guide and park the vehicle (the host vehicle) in order to park at an appropriate position with respect to the second obstacle.

The separated distance determination unit of the parking assistance device according to the embodiment may, for example, determine the separated distance as a distance in a third direction orthogonal to a first surface that extends in the extending direction of the second obstacle and extends in the vertical direction to a road surface, and the distance between the first surface and the first obstacle. According to this configuration, for example, the third direction is a depth direction of a space where the first obstacle and the second obstacle are present. Therefore, by setting a distance from the first surface and the first obstacle in the third direction as the separated distance, the state of the approach and separation of the first obstacle and the second obstacle can be detected. Therefore, it is possible to appropriately determine the target position for guiding the vehicle (the host vehicle).

In the parking assistance device according to the embodiment, for example, the first direction in a case where the first obstacles are lined up while being separated from each other may be defined as a direction indicated by an average angle of the angles indicated by the extending direction of each of the first obstacles. According to this configuration, for example, even in a case where the two first obstacles that are lined up while being separated from each other are present at positions separated from the second obstacle by different distances, it is possible to determine the target position to guide the vehicle (host vehicle) at the well-balanced position with respect to the two first obstacles.

The target position determination unit of the parking assistance device according to the embodiment may, for example, determine the target position such that the vehicle is separated from the second obstacle by a predetermined distance in a case where the separated distance between the first obstacle and the second obstacle is equal to or longer than the first distance and equal to or shorter than a second distance, and may determine the target position such that the first obstacle and the side-end portion are lined up in the first direction in a case where the separated distance between the first obstacle and the second obstacle is longer than the second distance. According to this configuration, it is possible to specifically determine the target position for guiding the vehicle based on the positional relationships between the first obstacle and the second obstacle.

The target position determination unit of the parking assistance device according to the embodiment may, for example, make the side-end portion not to protrude to the third direction from the farthest portion of the first obstacle in a third direction orthogonal to a first surface that extends in the extending direction of the second obstacle and extends in the vertical direction to a road surface, in a case where the separated distance between the first obstacle and the second obstacle is longer than the second distance. According to this configuration, for example, in a case where the separated distance between the first obstacle and the second obstacle is longer than the second distance, that is, in a case where the first obstacle and the second obstacle are sufficiently separated from each other, the depth for parking the vehicle can be regarded as sufficiently deep. In such a case, it is possible to determine the target position for guiding the vehicle such that the vehicle can be parked in a state in which the vehicle is completely parked in the parking space in such a manner that the vehicle (the host vehicle) does not protrude farther to the side of the second obstacle than the first obstacle, that is, does not protrude to the travelling road side.

The parking assistance device according to the embodiment, for example, may further include a proximity detection unit that detects the approach of the vehicle and the obstacle within a predetermined distance, and in a case where the proximity detection unit detects the approach of the obstacle, the control unit may guide the vehicle such that the vehicle avoids the obstacle. According to this configuration, it is possible to perform the parking assistance while reliably avoiding the contact between the vehicle and the first obstacle or the second obstacle during the parking assistance.

The embodiment of this disclosure and the modification examples are described. However, these embodiments and the modification examples are presented as examples without having an intention to limit the scope of this disclosure. These new embodiments can be embodied in various other forms, and various omissions, substitutions, and modifications can be performed without departing from the scope of this disclosure. These embodiments and the modifications can be included in the scope of this disclosure and are also included in the disclosure disclosed in the aspect of this disclosure and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle parking assistance device comprising:
   at least one distance measuring unit provided on the vehicle body;
   an obstacle detection unit that detects an obstacle;
   a separated distance determination unit that determines a separated distance between the obstacles in a case where a plurality of the obstacles are detected;
   a target position determination unit that determines a target position in a guidance route;
   a route calculation unit that calculates the guidance route; and
   a control unit that guides a vehicle in accordance with the guidance route, wherein guiding the vehicle comprises at least one of providing a voice or a video directing a driver to perform a driving operation along the guidance route, or sending a control signal to at least one of the vehicle steering system, braking system, or engine control device such that the vehicle automatically moves along the guidance route, wherein, in a case where a second obstacle is detected in a second direction which is orthogonal to a first direction in which a first obstacle extends or a plurality of first obstacles are lined up while being separated from each other and the second obstacle is detected at a position separated from the first direction, the separated distance determination unit determines the separated distance between the first obstacle and the second obstacle, wherein the target position determination unit
  determines a target position which is lined up with the first obstacle in the first direction and the target position which overlaps the second obstacle or is adjacent to the second obstacle,
  determines the target position such that the first obstacle and a side-end portion of the vehicle in a vehicle width direction which does not face the second obstacle are lined up in the first direction, in a case where the separated distance between the first obstacle and the second obstacle is shorter than a first distance, the target position being close to the second obstacle almost without a space to the second obstacle, the first distance being a distance in which a limit distance is added to a vehicle width,
  determines the target position such that the vehicle is separated by equal to or longer than a predetermined distance from the second obstacle, in a case where the separated distance between the first obstacle and the second obstacle is equal to or longer than the first distance, and wherein the limit distance is a distance from the second obstacle to which the vehicle is allowed to approach in a case where the second obstacle has such a long stature that the second obstacle intervenes opening and closing the second obstacle side door of the vehicle.

2. The parking assistance device according to claim 1,
wherein the separated distance determination unit determines the separated distance as a distance in a third direction orthogonal to a first surface that extends in the extending direction of the second obstacle and extends in the vertical direction to a road surface, and the distance between the first surface and the first obstacle.

3. The parking assistance device according to claim 1,
wherein the separated distance determination unit determines extending directions of each of the first obstacles in a case where the first obstacles are lined up while being separated from each other, and the first direction is defined as a direction based on the extending direction of each of the first obstacles.

4. The parking assistance device according to claim 1,
wherein, the target position determination unit
  determines the target position such that the vehicle is separated from the second obstacle by a predetermined distance in a case where the separated distance between the first obstacle and the second obstacle is equal to or longer than the first distance and equal to or shorter than a second distance, and
  determines the target position such that the first obstacle and the side-end portion are lined up in the first direction in a case where the separated distance between the first obstacle and the second obstacle is longer than the second distance.

5. The parking assistance device according to claim 4,
wherein, in a case where the separated distance between the first obstacle and the second obstacle is longer than the second distance, the target position determination unit makes the side-end portion not to protrude to the third direction from the farthest portion of the first obstacle in a third direction orthogonal to a first surface that extends in the extending direction of the second obstacle and extends in the vertical direction to a road surface.

6. The parking assistance device according to claim 1, further comprising:
  a proximity detection unit that detects the approach of the vehicle and the obstacle within a predetermined distance,
  wherein, in a case where the proximity detection unit detects the approach of the obstacle, the control unit guides the vehicle such that the vehicle avoids the obstacle.

7. The parking assistance device according to claim 1,
wherein, the obstacle detection unit is a sonar item.

* * * * *